US012743311B2

(12) United States Patent
Ravi et al.

(10) Patent No.: US 12,743,311 B2
(45) Date of Patent: Sep. 22, 2026

(54) SYSTEM AND METHOD OF IN-QUEUE OPTIMIZATIONS FOR QUANTUM CLOUD COMPUTING

(71) Applicant: University of Chicago, Chicago, IL (US)

(72) Inventors: Gokul Subramanian Ravi, Chicago, IL (US); Frederic T. Chong, Chicago, IL (US); Pranav Gokhale, Chicago, IL (US); Kaitlin N. Smith, Chicago, IL (US)

(73) Assignee: The University of Chicago, Chicago, IL (US)

( * ) Notice: Subject to any disclaimer, the term of this patent is extended or adjusted under 35 U.S.C. 154(b) by 394 days.

(21) Appl. No.: 18/554,835

(22) PCT Filed: Apr. 13, 2022

(86) PCT No.: PCT/US2022/024618

§ 371 (c)(1),
(2) Date: Oct. 11, 2023

(87) PCT Pub. No.: WO2022/231846

PCT Pub. Date: Nov. 3, 2022

(65) Prior Publication Data

US 2024/0378085 A1 Nov. 14, 2024

Related U.S. Application Data

(60) Provisional application No. 63/306,196, filed on Feb. 3, 2022, provisional application No. 63/252,371, filed (Continued)

(51) Int. Cl.
*G06F 9/50* (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS 11,086,665 B2 * 8/2021 Griffin .................. G06F 9/4881
11,194,554 B2 * 12/2021 Gambetta ................. G06F 8/36

(Continued)

FOREIGN PATENT DOCUMENTS

CN 108734299 A * 11/2018 ............. G06N 10/60
CN 111165052 A * 5/2020 ........... G06F 9/5077

OTHER PUBLICATIONS

International Search Report and Written Opinion for Patent Application PCT/US2022/024618 mailed Aug. 16, 2022; 16 pp.

(Continued)

*Primary Examiner* — Charles E Anya
(74) *Attorney, Agent, or Firm* — Armstrong Teasdale LLP

(57) ABSTRACT

A quantum computing system providing quantum processing as a service includes a quantum computing device and a server including at least one classical processor. The server is configured to: create a first job queue that includes a plurality of jobs configured to be executed on the first quantum computing device; receive, from a client device, a request for execution of a quantum program; add a first job entry to the first job queue for the request, the first job entry includes a quantum circuit for a first job; perform an optimization process on the quantum circuit of the first job; transmit the updated quantum circuit to the first quantum computing device for execution by the first quantum computing device using the plurality of qubits; receive, from the quantum computing device, execution results from the execution of the updated quantum circuit; and transmit the execution results to the client device.

20 Claims, 5 Drawing Sheets

Related U.S. Application Data on Oct. 5, 2021, provisional application No. 63/180,369, filed on Apr. 27, 2021.

(56) References Cited

U.S. PATENT DOCUMENTS

| | | | | |
|---|---|---|---|---|
| 11,194,573 | B1 * | 12/2021 | Smith | G06F 8/41 |
| 11,270,220 | B1 * | 3/2022 | Richardson | G06F 9/5044 |
| 2011/0296120 | A1 * | 12/2011 | Khan | G06F 9/54 711/155 |
| 2018/0365585 | A1 * | 12/2018 | Smith | G06F 9/546 |
| 2019/0340007 | A1 | 11/2019 | Malik et al. | |
| 2019/0354398 | A1 | 11/2019 | Aggarwal et al. | |
| 2020/0026551 | A1 * | 1/2020 | Ducore | G06F 15/80 |
| 2020/0117511 | A1 * | 4/2020 | Reinhardt | G06F 9/5038 |
| 2020/0326977 | A1 * | 10/2020 | Gambetta | G06F 9/4881 |
| 2020/0401427 | A1 * | 12/2020 | Gambetta | G06F 9/455 |
| 2021/0012233 | A1 * | 1/2021 | Gambetta | G06F 8/44 |
| 2021/0158199 | A1 | 5/2021 | Heckey et al. | |
| 2021/0158232 | A1 * | 5/2021 | Bolt | G06N 10/60 |
| 2022/0188680 | A1 * | 6/2022 | Nation | G06F 8/443 |
| 2023/0186130 | A1 * | 6/2023 | Yu | G06F 30/39 359/107 |
| 2023/0236873 | A1 * | 7/2023 | Nguyen | G06F 9/48 718/102 |
| 2024/0104417 | A1 * | 3/2024 | Yu | G06F 9/4881 |

OTHER PUBLICATIONS

Das Poulami: “A Case for Multi-Programming Quantum Computers”, Proceedings of the 52nd annual IEEE/ACM international symposium on microarchitechture, micro ’52, ACM press, New York, New York, USA Oct. 12, 2019; 13 pps.

Lei Liu, et al.: “QuCloud: A New Qubit Mapping Mechanism for Multi-programming Quantum Computing in Cloud Environment” 2021 IEEE International Symposium on Hight-Performance Computer Architecture (HPCA), Feb. 27, 2021; 12 pps.

Frank Leymann, et al.: “Quantum in the Cloud: Application Potentials and Research Opportunities” Proceedings of the 10th International Conference Cloud Computing and Services Science, Jan. 1, 2020; 16 pps.

Matthew Amy, et al.: “Polynomial-Time T-Depth Opitimization of Clifford+T Circuits Via Matroid Partitioning” IEEE Transactions on Computer-Aided Design of Integrated Circuits and Systems, vol. 33, No. 10, Oct. 1, 2014; 25 pps.

Extended European Search Report received in EP22796381 on Feb. 4, 2025; 11 pps.

Office action and Search Report for Japanese patent application No. JP2023-566423 received Mar. 31, 2026, 3-pages.

* cited by examiner

SYSTEM AND METHOD OF IN-QUEUE OPTIMIZATIONS FOR QUANTUM CLOUD COMPUTING

CROSS REFERENCE TO RELATED APPLICATIONS

This application is a U.S. National Phase Application of PCT/US2022/024618 filed Apr. 13, 2022, which claims the benefit of Provisional Patent Application Ser. No. 63/180,369, entitled SYSTEM AND METHOD OF IN-QUEUE OPTIMIZATIONS FOR QUANTUM CLOUD COMPUTING, filed Apr. 27, 2021, Provisional Patent Application Ser. No. 63/252,371, entitled SYSTEM AND METHOD OF IN-QUEUE OPTIMIZATIONS FOR QUANTUM CLOUD COMPUTING, filed Oct. 5, 2021, and to Provisional Patent Application Ser. No. 63/306,196, entitled SYSTEM AND METHOD OF IN-QUEUE OPTIMIZATIONS FOR QUANTUM CLOUD COMPUTING, filed Feb. 3, 2022, the contents of which are incorporated herein in their entirety.

STATEMENT REGARDING FEDERALLY SPONSORED RESEARCH & DEVELOPMENT

This invention was made with government support under 2030859, 1730449, and 2016136 awarded by the National Science Foundation. The government has certain rights in the invention.

TECHNICAL FIELD

This disclosure relates generally to quantum and classical cloud computing and, more specifically, to systems and methods for in-queue optimizations for quantum, classical, and quantum-classical hybrid cloud computing.

BACKGROUND

Quantum computing is a revolutionary computational model that leverages quantum mechanical phenomena for solving intractable problems. Quantum computers ("QCs") evaluate quantum circuits or programs in a manner similar to a classical computer, but quantum information's ability to leverage superposition, interference, and entanglement is projected to give QCs significant advantage with various particular processing problems, such as in the fields of cryptography, chemistry, optimization, and machine learning.

In the current Noisy Intermediate-Scale Quantum ("NISQ") era of quantum computing, QCs are expected to include hundreds or thousands of qubits that are acted upon by imperfect gates. Further, the connectivity in these QCs may be sparese and qubits may have modest lifetimes. Given these limitations, NISQ-era machines may be unable to execute large-scale quantum algorithms such as, for example, Shor Factoring and Grover Search, which may rely on error correction of millions of qubits to create fault-tolerant quantum systems.

Further, there is scarcity in the availability of quantum resources to meet the ever growing quantum demands. Cloud-based quantum information processing ("QIP") platforms are available in the cloud, for both privileged as well as open access, are very limited in number, while the number of users and the number of "jobs" submitted to these machines are drastically growing every day. With the increasing popularity of quantum computing in both industry and academic research, it is expected that these contention trends will continue to worsen over the next decade or more until, for example, the cost of building large and reliable quantum computers becomes more easily surmountable.

Still at a nascent stage, QCs are an extremely scarce and expensive resource due to, for example, difficulty to design, manufacture, and maintain such devices. A first-order impact of quantum machine scarcity and contention is the long queuing times experienced while trying to access these machines on the cloud. While quantum machines available in the cloud are very limited in number, the number of users and the number of "jobs" submitted to these machines are drastically growing every day. With the increasing popularity of QCs in both industry and academic research, it is expected that these contention trends will continue to increase. For example, there can be tens to hundreds of quantum jobs queued on IBM quantum machines, at any given time/day of the week, even for privileged access. These numbers can jump into the thousands on machines that are open to public access. This results in queuing times of many hours and sometimes even days. These numbers are especially harmful for quantum processing because compilation times are usually in the order of minutes or at most a few hours even for larger circuits. Further, the actual quantum execution runtime on the quantum machines is only in the order of seconds or minutes. Such accessibility constraints in using these machines can severely handicap research endeavors, such as the scope of the quantum problems that can be effectively targeted on these QCs and the timely access to the QCs irrespective of the quantum problem.

Thus, as demand for quantum computation services grows, it is imperative to efficiently manage quantum resources. Unfortunately, the current state of scheduling in the quantum cloud has numerous deficiencies. In today's conventional cloud services for quantum computing, queued time amounts to wasted time. Quantum jobs which are submitted to a quantum machine sit idle in the machine's queue until they reach the head of the queue. Accordingly, there is tremendous potential to utilize this wasted queuing time to instead perform actions that can improve the quality of the results returned by the quantum machine to the user (e.g., for their specific quantum problem).

SUMMARY

In one aspect, a quantum computing system providing quantum processing as a service is provided. The quantum computing system includes a first quantum computing device including a plurality of qubits. The quantum computing system also includes a queueing and optimizations ("QaO") server including at least one classical processor and storing instructions that, when executed by the at least one classical processor, cause the at least one classical processor to: (i) create a first job queue that includes a plurality of jobs configured to be executed on the first quantum computing device; (ii) receive, from a client device, a request for execution of a quantum program; (iii) add a first job entry to the first job queue for the request, the first job entry includes a quantum circuit for a first job; (iv) perform an optimization process on the quantum circuit of the first job, the optimization process changes the quantum circuit to an updated quantum circuit; (v) transmit the updated quantum circuit to the first quantum computing device, thereby causing the updated quantum circuit to be executed by the first quantum computing device using the plurality of qubits; (vi) receive, from the quantum computing device, execution results from the execution of the updated quantum circuit; and (vii) transmit the execution results to the client device.

In another aspect, a method for providing quantum processing as a service is provided. The method utilizes a first quantum computing device that includes a plurality of qubits. The method also utilizes a queueing and optimizations ("QaO") server that including at least one classical processor. The method includes creating a first job queue that includes a plurality of jobs configured to be executed on the first quantum computing device. The method also includes receiving, from a client device, a request for execution of a quantum program. The method further includes adding a first job entry to the first job queue for the request, the first job entry includes a quantum circuit for a first job. The method also includes performing an optimization process on the quantum circuit of the first job, the optimization process changes the quantum circuit to an updated quantum circuit. The method further includes transmitting the updated quantum circuit to the first quantum computing device, thereby causing the updated quantum circuit to be executed by the first quantum computing device using the plurality of qubits. The method also includes receiving, from the quantum computing device, execution results from the execution of the updated quantum circuit. The method further includes transmitting the execution results to the client device.

In yet another aspect, a non-transitory computer-readable medium storing instructions is provided. When executed by at least one classical processor, the instructions cause the at least one classical processor to: (i) create a first job queue that includes a plurality of jobs configured to be executed on a first quantum computing device that includes a plurality of qubits; (ii) receive, from a client device, a request for execution of a quantum program; (iii) add a first job entry to the first job queue for the request, the first job entry includes a quantum circuit for a first job; (iv) perform an optimization process on the quantum circuit of the first job, the optimization process changes the quantum circuit to an updated quantum circuit; (v) transmit the updated quantum circuit to the first quantum computing device, thereby causing the updated quantum circuit to be executed by the first quantum computing device using the plurality of qubits; (vi) receive, from the quantum computing device, execution results from the execution of the updated quantum circuit; and (vii) transmit the execution results to the client device.

BRIEF DESCRIPTION OF THE DRAWINGS

FIG. 1 is a diagram illustrating a networked architecture of an example cloud processing system providing processing as a service.

FIG. 2 is a diagram of particular components of the cloud processing system related to quantum computing, including the classical control computing device and the quantum computing device.

FIG. 3 is a data flow diagram illustrating example queue management, preparation processes, and execution operations performed by the QaO server shown in FIG. 1.

FIG. 4 is a diagram of example virtual queues that may be provided by the cloud processing system.

FIG. 5 is an example method for device selection when receiving a new request for quantum processing.

DETAILED DESCRIPTION OF THE DISCLOSURE

Figure 1:
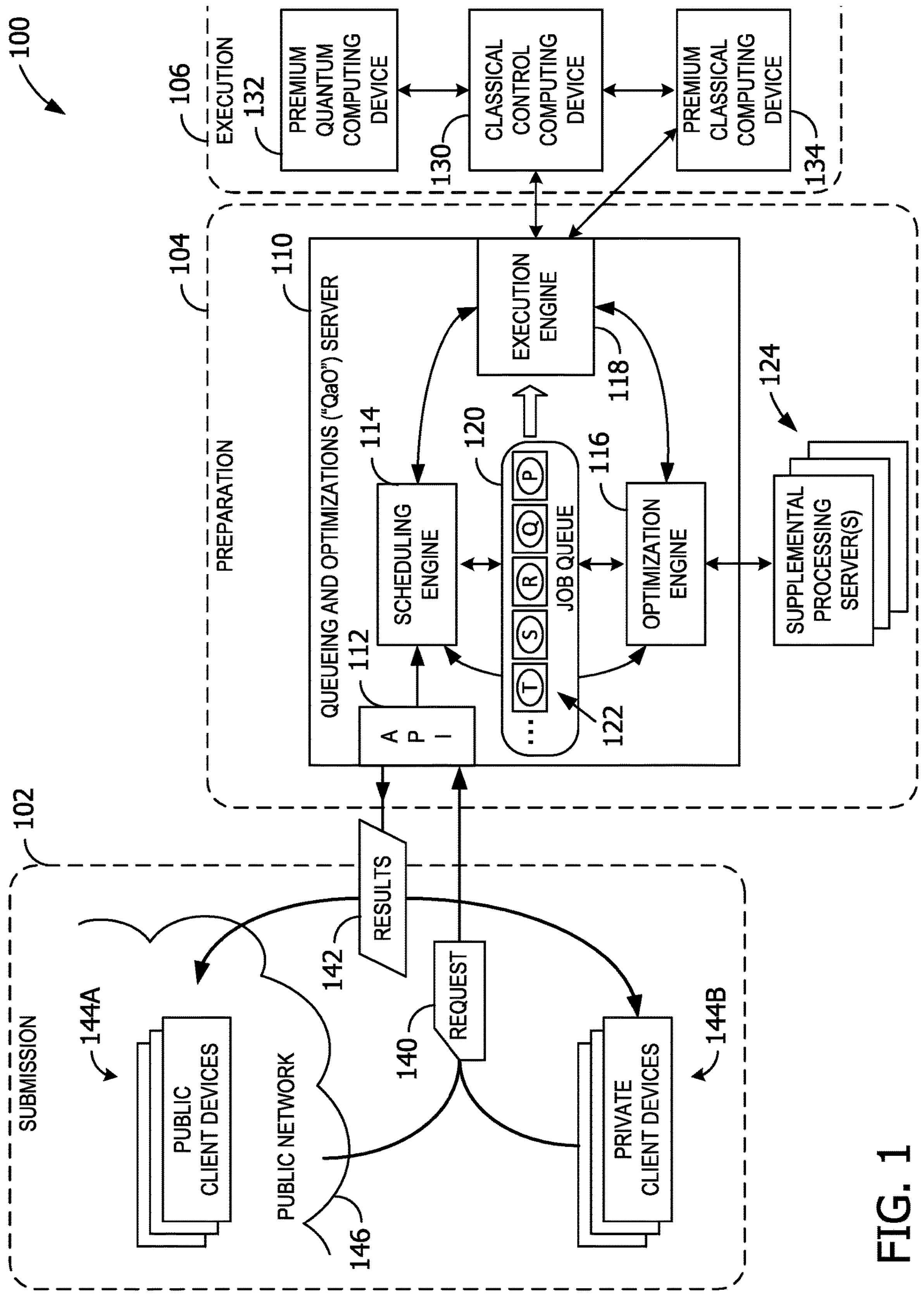
FIGS. 1-5 show exemplary embodiments of the methods and systems described herein.

The following detailed description illustrates embodiments of the disclosure by way of example and not by way of limitation. It is contemplated that the disclosure has general application to quantum computing, classical computing, and quantum-classical hybrid computing in, for example, client/server or cloud computing architectures.

In conventional cloud-based processing systems (e.g., classical information processing systems or QIP systems), a job queue is typically provided for, and dedicated to, a particular target computing device (e.g., a particular supercomputer or a particular quantum computer). In classical computing environments, the user may select a target classical computing device based on processing performance (e.g., faster clock speed, more cores, more floating point operations per second, number of threads, or the like). In contrast, in quantum computing environments, users may select a target quantum computing device based on quantum device characteristics (e.g., number of qubits, type of quantum hardware, or the like). When a user's job is submitted to the selected target device, the processing system may place the job on the job queue for that particular target device. Typical processing systems provide a scheduling algorithm that incorporates aspects of first-in, first-out ("FIFO") job scheduling, perhaps along with additional considerations such as a priority agreement with the user, or the like.

Quantum computing technology exhibits some key differences over classical computing technology. For example, quantum computing devices are typically more prone to error than classical computing devices. Thus, maximizing execution fidelity in quantum processing is a first-order constraint and a primary concern, where the greater reliability and predictability of classical processing allows focus more on performance and energy efficiency. Further, the execution of quantum applications are substantially dependent on and sensitive to the target quantum computing device and its characteristics, some of which may vary through time, where classical computing devices typically provide more stable characteristics. Thus, scheduling of quantum processing can be improved by leveraging current information on the target quantum computing device prior to execution. Additionally, quantum jobs and their associated circuits are expected to be lower in complexity, resulting in their execution characteristics being more easily predictable.

Systems and methods are described herein that address these and other technical problems in quantum and classical computing. In an example embodiment, a cloud-based quantum information processing ("QIP") system seeks to improve the quality of results for quantum problems at hand, by means of optimizations to the quantum circuit(s) for the specified problem. These optimizations are performed while the jobs are queued up awaiting execution. In an example embodiment, the QIP system provides job scheduling services that maximize execution fidelity at low system load, minimizes wait times at high system load, and otherwise provides a balanced approach that accounts for users' quality of service ("QoS") terms (e.g., maximum wait times) while accounting for the effects of QC device recalibration and optimizing calibration schedules for improved fidelity and lower wait times. The QIP system improves upon existing quantum job schedulers through use of an automated, adaptive job scheduler that schedules quantum jobs onto QCs and which optimizes for both fidelity and wait time, as well as accounts for various additional objectives. The QIP system provides a novel prediction model that predicts correlation between compiled quantum circuit features and their machine execution fidelity across a diverse set of quantum applications and QCs. The QUI system also provides a queuing time prediction model that estimates the execution times of jobs on various QCs. These prediction models are integrated into the QIP system such as to balance various performance characteristics, meet QoS requirements, and minimize the effects of stale compilations for jobs. The QIP system further improves on stale machine compilations by exploring the relationship between machine calibration cycles and job schedules, providing improvements to calibration schedules through a "staggering" approach.

Some example optimizations fall broadly into two classes: (1) intra-job optimizations and (2) inter-job optimizations. Intra-job optimizations target optimizing a particular quantum circuit (e.g., submitted as a "job" to be executed on a quantum computing device) by improving the quality of the circuit in various ways (e.g., to increase the probability of execution success, fidelity, or the like) after that job is placed on the queue but before execution. Inter-job optimizations target scenarios where a quantum problem requires the execution of multiple quantum circuits (e.g., multiple jobs) and optimizations are performed between job executions. In such scenarios, when multiple jobs for a single problem are queued up and executed in sequence, inter-job optimizations focus on the ability to add, remove, or modify subsequent jobs based on analysis of the earlier executing jobs. This can improve quality or fidelity of the solution, reduce overall execution time for the problem, or otherwise improve quantum machine throughput.

The term "classical," as used herein, refers to conventional transistor-based computing technology or other non-quantum based processing technologies (e.g., analog computing, superconducting computing). This term, where necessary, is used to distinguish such computing devices or associated hardware, software, algorithms, and such, from "quantum" computing. Quantum computing devices, or just "quantum computers" ("QCs") and associated hardware, software, algorithms, and such, are typically distinguished from classical computing devices based on their reliance on quantum phenomena of quantum mechanics to perform processing operations (e.g., using "qubits," or quantum bits). Example classical computing devices include conventional personal computers, servers, tablets, smartphones, x86-based processors, random access memory ("RAM") modules, and so forth. Example quantum computing devices include "IBM Q" devices from International Business Machines (IBM), "Bristlecone" quantum computing device from Google, "Tangle Lake" quantum computing device from Intel, and "2000Q" from D-Wave. The term "classical bit" or "cbit" may be used herein to refer to a bit within classical computing. The term "qubit" may be used herein to refer to a quantum bit in quantum computing. While QCs include quantum computing hardware that relies upon quantum mechanics for processing, it should be understood that such QCs and associated QIP systems typically rely upon various classical computing devices for normal operation (e.g., job scheduling, preparation, compilation, signal generation, and the like).

Quantum programming languages and compilers use a quantum assembly language composed of 1- and 2-qubit gates. Quantum compiler frameworks translate this quantum assembly into control pulses, typically electric signals that implement the specified computation on a specific quantum computing device. A quantum circuit represents a list of instructions bound to some registers that has a number of gates and is spread out over a number of qubits. Compilation of a quantum circuit involves a sequence of steps to enable the quantum circuit to be executed on a particular QC. A quantum job ("QC job," or just "job," depending on context) encapsulates a single circuit or a batch of circuits that executes on a QC. The circuits within a batched job may be treated as a single task such that all quantum circuits are executed successively, and each circuit in a job may be rapidly re-executed for a particular number of "shots."

When the QIP system compiles quantum circuits for execution, the compilation may incorporate static device characteristics such as device topology and device basis gates, and may also incorporate dynamic characteristics such as gate or qubit fidelity. Some dynamic characteristics evolve and change over time. These characteristics may be re-calibrated on some coarse granularity (e.g., once per day) and may be non-uniform (e.g., one day's qubit fidelity can be very different from the next day's qubit fidelity). Further, these characteristics may also drift over time (e.g., they can differ within a single calibration cycle). Spatial variability may also be present across different QCs. Even if QCs are manufactured in highly controlled settings, unavoidable variation results in intrinsic properties that impact performance. Even if QCs have the same number of qubits, their qubit error values may differ (e.g., errors in CX gate execution). Thus, the QIP system considers such machine characteristics and their impact on applications by analyzing how different QC characteristics affect application fidelity and schedule jobs to various QCs accordingly. Such static and dynamic characteristics are typically not known or well understood by users.

Further, in scenarios where jobs experience extended queuing times, the dynamic characteristics which may have been accounted for during initial job preparation may be very different on the QCs by the time the job is ready for execution, which would result in the job being executed sub-optimally (e.g., with detrimental fidelity or the like) if the job is not reoptimized. Accordingly, the QIP system incorporates re-optimization operations in conjunction with expected execution times and time-sensitive dynamic characteristics of the target QC to maximize execution performance. Note that in gate-based compilation approaches, the quantum gates are converted to pulses at the time of execution. As such, the QIP system uses the most recently calibrated pulses to execute the gates on the particular QC (e.g., after the job reaches the head of the queue and is ready for actual quantum execution). In pulse-based compilation approaches, pulses are generated at the time of compilation. As such, these pulses are generated based on machine characteristics at the time of compilation.

FIG. 1 is a diagram illustrating a networked architecture of an example cloud processing system 100 providing processing as a service. In the example embodiment, the cloud processing system 100 provides computational services (e.g., execution of computational jobs) to various customers wanting access to quantum computing resources or classical high performance computing ("HPC") resources (e.g., supercomputers, compute farms, cluster HPCs, or the like). For purposes of illustration, FIG. 1 categorizes various components and data flow of the cloud processing system 100 in the context of submission 102, preparation 104, and execution 106. Many of the examples provided herein are described in relation to quantum computing, where the system 100 provides quantum processing as a service ("QaaS"), also referred to herein as quantum information processing ("QIP"). The cloud processing system 100, in the example embodiment, may be a QIP system (e.g., providing processing services for QC devices), a classical information processing system (e.g., providing processing services for classical computing devices), or a hybrid system (e.g., supporting some combination of both quantum and classical computing devices). While many of the example embodiments are described in relation to QIP and QC devices, it should be understood that this system 100 may also provide classical processing as a service, and likewise, many of the methods described herein my similarly apply to classical computing devices and processing. Further, while the architecture of the example embodiment is provided as a cloud-based service, the scheduling and execution functionality described herein may be provided in a non-cloud architecture, such as a stand-alone, server-based, or client/server-based architecture (e.g., accepting jobs from submitting client devices for execution).

A queueing and optimizations server ("QaO server") 110 controls receipt of job requests 140 from requesting devices 144, such as from public client devices 144A (e.g., via a public network 146 such as the Internet) or from private client devices 144B (e.g., via enterprise network, private network, or the like). The QaO server 110 also prepares and schedules jobs 122 on a job queue 120 for execution on one or more backend computing resources, such as a quantum computing device 132 or a classical computing device 134 (e.g., a supercomputer or other HPC devices). The computational devices upon which such jobs 122 are executed may be referred to herein as "premium computing devices," as they represent the computational devices that are provided as the focus of job executions, the core computational workload that is the focus of job requests 140. The premium computing devices 132 are considered premium devices, for example, due to rarity, expense to operate, or availability.

In the example embodiment, job requests 140 represent requests for the Cloud Processing System 100 to perform execution of some computational workload. Some job requests 140 may include quantum programs, and thus may target execution on premium quantum computing devices 132. Some job requests 140 may include classical programs, and thus may target execution on premium classical computing devices 134. The data initially provided with the job requests 140 may be referred to herein as request inputs. Request inputs may include source code, executable code, or some intermediary code or other components used to execute the computational workload associated with the request 140. For example, with requests 140 that are quantum based ("quantum-based requests," e.g., requesting execution on one of the premium quantum computing device 132), the request 140 may include or otherwise reference source code (e.g., uncompiled code) or some intermediate compilation components (e.g., initial layout selection, routing mapping, execution schedule, pulses or pulse level control commands) for a quantum program. With requests 140 that are classically based ("classically-based requests," e.g., requesting execution on one of the premium classical computing devices 134), the request inputs may include or otherwise reference source code (e.g., uncompiled code, scripts in interpreted languages) or executable code (e.g., compiled code). Request inputs may also include data, settings, control parameters, or other information used in preparation or execution of the request 140.

The QaO server 110, in the example embodiment, provides an application programming interface ("API") 112 through which requesting devices 144 can submit job requests 140 and receive job results (or just "results") 142 in response. The requests 140 received through the API 112 may be authenticated and associated with a particular user (e.g., having a unique user ID of a "requesting user"). The QaO server 110 may consider user identity, for example, when ordering jobs 122 on the job queue 120, to control access to particular premium computing devices 132, 134, to track and bill for execution time performed on premium computing devices 132, 134, and to control access to job configurations or request inputs (e.g., before, during, or after an execution of a request 140 has completed). In some embodiments, the QaO server 110 may provide abilities to the requesting user that allows the user to modify their umbrella job 310 or individual jobs 122 on the queue 120 (e.g., until some pre-determined cut-off time just before actual execution of the associated compute job 202 is sent to the quantum computing device 132 for execution). In this way, the user is allowed to modify the quantum circuit(s) in their jobs 122, perhaps based on any feedback received from the quantum computing device 132, from prior jobs 122, or for other reasoning privy to the user.

In the example embodiment, the QaO server 110 includes a scheduling engine 114, an optimization engine 116, and an execution engine 118. Broadly speaking, the scheduling engine 114 acts as the controlling module for the QaO server 110, performing such tasks as communicating with the client devices 144 (e.g., via the API 112), managing the job queue 120 (e.g., adding new jobs 122 to the job queue 120, reordering jobs 122, editing job details for the jobs 122 on the queue 120, removing jobs 122 from the job queue 120), coordinating optimization tasks to be performed on jobs 122 by the optimization engine 116 (e.g., identifying jobs 122 on which to perform optimizations, identifying which optimizations to perform on those jobs, dispatching optimization tasks to the optimization engine 116), and coordinating execution tasks to be performed by the execution engine 118 (e.g., analyzing outputs returned from execution of jobs 122). Various operational details performed by the scheduling engine 114 are described in greater detail below with respect to FIG. 3 and FIG. 5.

The optimization engine 116, in the example embodiment, performs optimization processing of jobs 122 on the job queue 120. During operation, the optimization engine 116 receives optimization tasks from the scheduling engine 114. These optimization tasks may identify what type of optimization process to perform, and on what particular job 122 to perform that optimization process. Such optimization processes may be categorized herein as quantum optimization processes (e.g., those optimizations directed at enabling or improving quantum application execution on premium quantum computing devices 132) and classical optimization processes (e.g., those optimizations directed at enabling or improving classical application execution on premium classical computing devices 134). Further, these optimization tasks may be categorized and referred to herein as intra-job optimizations, where the optimization process is performed on a simple job 122 as that job 122 sits on the queue 120, or inter-job optimizations, where the optimization process is performed between executions of a related set of jobs 122 (e.g., between iterations of an iterative application). Upon completion of a given optimization task, the optimization engine 116 may then update the associated job 122 with the optimization results (e.g., a new compiled executable for a classical job, an updated layout selection, routing, or schedule for a quantum application, or the like). Various types of quantum and classical optimization processes and operations performed by the optimization engine 116 are described in greater detail below with respect to FIG. 3.

Some optimization processes may be computationally intensive. Accordingly, the optimization engine 116 may perform optimization tasks locally (e.g., using processing hardware on the QaO server 110) or may leverage external computational resources, such as supplemental processing servers 124, for processing the optimization processes. For example, the optimization engine 116 may transmit an optimization process message to a supplemental processing server 124 (e.g., with particular inputs related to the job 122), which subsequently executes the optimization process on the supplemental processing server 124. Upon completion, the optimization engine 116 receives the results of the optimization process from the supplemental processing server 124 and updates the associated job 122 accordingly. In some embodiments, the optimization engine 116 may be configured to use the requesting client device 144 associated with the job 122 as a supplemental processing server (e.g., for performing the processing of preparation operations). As such, the QaO server 110 is able to leverage additional processing hardware in order to offload burdensome computational workload.

Figure 2:
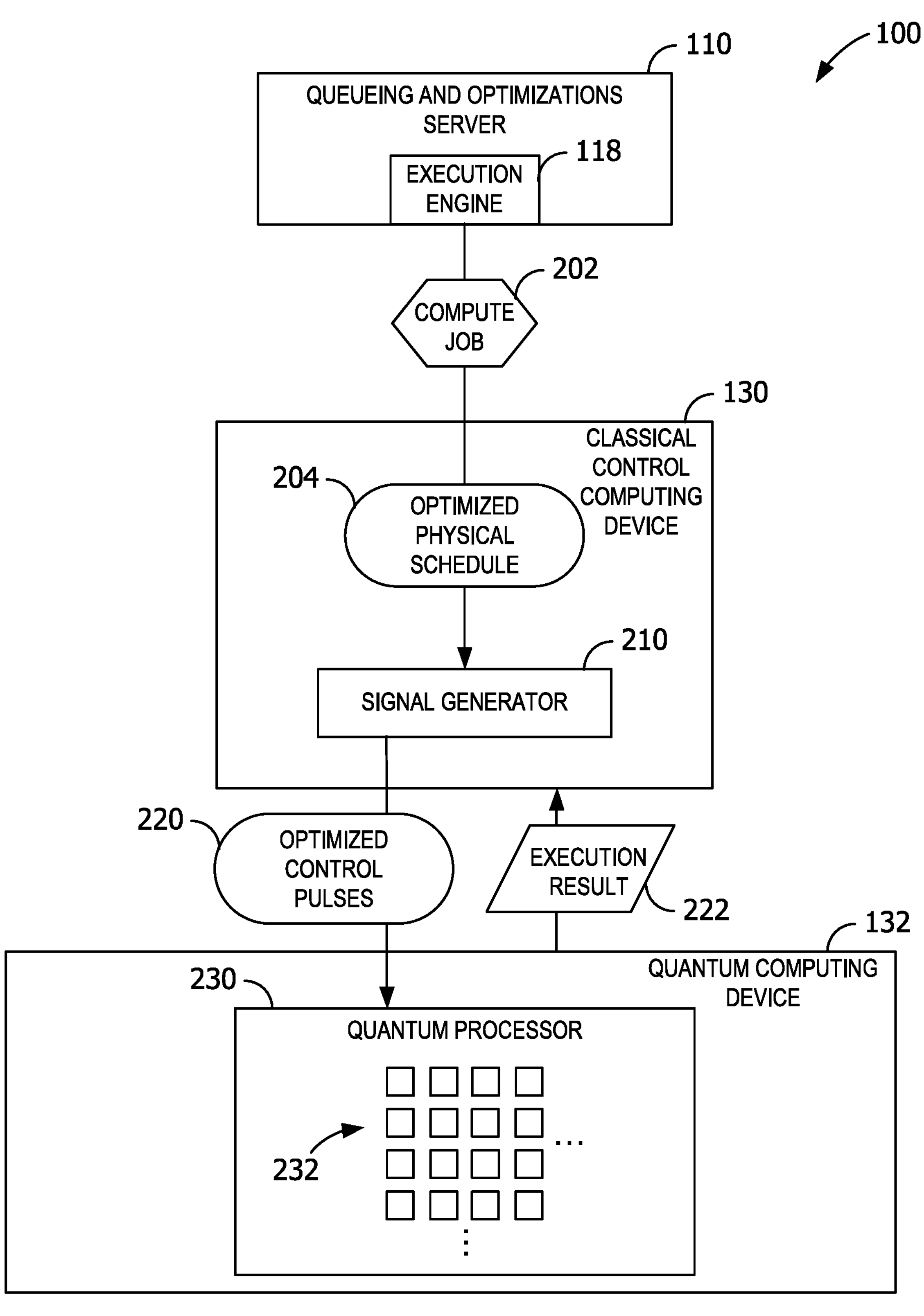

The execution engine 118, in the example embodiment, controls execution of jobs 122 from the job queue 120. During operation, the execution engine 118 submits a job 122 for execution on one or more of the premium computing devices 132, 134. In some embodiments, for execution of quantum jobs 122, the execution engine 118 sends such jobs 122, and associated job components, as a compute job to a classical control computing device 130 that controls a premium quantum computing device 132. In some quantum application embodiments, the classical control computing device 130 may prepare and execute the compute job on the quantum computing device 132 and return execution results to the execution engine 118. The classical control computing device 130 may, for example, include a signal generator that is configured to generate control pulses for the compute job to execute on the quantum computing device 132. In some embodiments, the execution engine 118 may communicate directly with the premium computing devices 132, 134 (e.g., in lieu of the classical control computing device). For example, the QaO server 110 may execute a signal generator to generate control pulses for a particular quantum job 122, send those control pulses directly to the quantum computing device 132, and receive execution results directly from the quantum computing device 132. FIG. 2 provides additional details, below, regarding the classical control computing device 130 and quantum computing device 132.

In some embodiments, the QaO server 110 may use the job queue 120 for jobs 122 running on multiple distinct premium computing devices 132, 134. For example, the QaO server 110 may manage job execution on multiple quantum computing devices 132 and, as such, may allow jobs 122 to be added to the job queue 120 that can target any or all of those quantum computing devices 132 for execution. Such a shared queue execution environment may allow a given job 122 to specify or otherwise be assigned to one particular quantum computing device 132, or may allow a given job 122 to execute on any of the multiple quantum computing devices 132 (e.g., based on availability). While example embodiments described herein may include a single job queue 120 with jobs 122 for a single premium quantum computing device 132, it should be understood that any number of job queues 120 may be provided, and any of those job queues 120 may be dedicated or shared job queues.

In some embodiments, the QaO server 110 may create and maintain multiple job queues 120, for multiple premium computing devices 132, 134, where each job queue 120 is dedicated to a particular premium computing device 132, 134. For example, in one embodiment, the QaO server 110 may create a job queue 120 dedicated to a first quantum computing device 132 and a second job queue 120 dedicated to a second quantum computing device 132. As such, jobs 122 specifying or otherwise assigned to execute on the first quantum computing device 132 can be placed on a first job queue 120 and jobs 122 specifying or otherwise assigned to execute on the second computing device 132 can be placed on a second job queue 120. In some embodiments, the scheduling engine 114 may assign particular jobs to particular premium computing devices 132, 134 or move jobs 122 between job queues 120 (e.g., based on client request, cost considerations, performance needs, projected wait times, transient device availability, or the like). Such targeting of jobs 122 to particular premium computing devices 132, 134, prior to execution, whether in shared or dedicated queue implementations, may allow the QaO server 110 to optimize particular jobs based on their assigned premium computing device 132, 134. For example, when quantum circuits are compiled, they may be compiled in a device aware manner (e.g., for static or dynamic characteristics of particular computing devices 132, 134). While compilation may involve static characteristics such as device topology and device basis gates, compilation may also incorporate dynamic characteristics of the particular quantum computing device 132, such as gate/qubit fidelity. Such dynamic characteristics are dynamic because they may evolve over time. Such characteristics of qubits and gates may be recalibrated at some course granularity (e.g., once per day) and such calibrations may be non-uniform (e.g., on day's qubit fidelity may be very different from the next day's qubit fidelity). Accordingly, targeting of particular quantum computing devices 132 allows the QaO server 110 to target optimizations particular to a recent state of the dynamic characteristics of that targeted quantum computing device 132.

FIG. 2 is a diagram of particular components of the cloud processing system 100 related to quantum computing, including the classical control computing device 130 and the quantum computing device 132. In the example embodiment, the classical control computing device 130 is configured to prepare and execute a compute job sent from the QaO server 110 (e.g., from the execution engine 118) for execution on the quantum computing device 132. The quantum computing device 132 includes a quantum processor 230 having multiple qubits 232 upon which the compute job 202 is executed. In some embodiments, the quantum processor 230 may include 50 or 100 qubits 232, but it should be understood that the present disclosure is envisioned to be operable and beneficial for quantum processors with many tens, hundreds, or more qubits 232.

The qubit 232 is the basic element of a quantum computing device such as the quantum computing device 132 shown here and in FIG. 1. In contrast to classical bits ("cbits"), qubits are capable of existing in a superposition of logical states, notated herein as $|0\rangle$ and $|1\rangle$. The general quantum state of a qubit may be represented as:

$$|\psi 1\rangle = \alpha|0\rangle + \beta|1\rangle,$$

where $\alpha$, $\beta$ are complex coefficients with $|\alpha|^2+|\beta|^2=1$. When measured in the 0/1 basis, the quantum state collapses to $|0\rangle$ or $|1\rangle$ with a probability of $|\alpha|^2$ and $|\beta|^2$, respectively. The qubit 232 can be visualized as a point on a 3D sphere called the Bloch sphere. Qubits 232 can be realized on different Quantum Information Processing (QIP) platforms, including ion traps, quantum dot systems, and, in the example embodiment, superconducting circuits. The number of quantum logical states grows exponentially with the number of qubits 232 in the quantum processor 230. For example, a system with three qubits 232 can live in the superposition of eight logical states: $|000\rangle$, $|001\rangle$, $|010\rangle$, $|011\rangle$, . . . , $|111\rangle$. This property sets the foundation of potential quantum speedup over classical computation. In other words, an exponential number of correlated logical states can be stored and processed simultaneously by the quantum computing device 132 with a linear number of qubits 232.

During quantum compilation, a quantum program may first be decomposed into a set of 1- and 2-qubit discrete quantum operations called logical quantum gates. These quantum gates are represented in matrix form as unitary matrices. 1-qubit gates correspond to rotations along a particular axis on the Bloch sphere. In an example quantum ISA, the 1-qubit gate set may include rotations along the x-, y-, and z-axes of the Block sphere. Such gates are notated herein as $R_x$, $R_y$, and $R_z$ gates, respectively. Further, the quantum ISA may also include a Hadamard gate, which corresponds to a rotation about the diagonal x+z axis. An example of a 2-qubit logical gate in the quantum ISA is a Controlled-NOT ("CNOT") gate, which flips the state of the target qubit if the control qubit is $|1\rangle$ or leaves the state unchanged if the control qubit is $|0\rangle$. For example, the CNOT gate sends $|10\rangle$ to $|11\rangle$, sends $|11\rangle$ to $|10\rangle$, and preserves the other logical states.

Further, it should be understood that the general logical assembly instructions typically used during compilation of the quantum program may be designed without direct consideration for the variations in the types of physical hardware that may be used. As such, there is often a mismatch between the logical instructions and the capabilities of the particular QIP platform. For example, on some QIP platforms, it may not be obvious how to implement the CNOT gate directly on that particular physical platform. As such, a CNOT gate may be further decomposed into physical gates in a standard gate-based compilation. Other example physical quantum gates for various architectures include, for example, in platforms with Heisenberg interaction Hamiltonian, such as quantum dots, the directly implementable 2-qubit physical gate is the $\sqrt{SWAP}$ gate (which implements a SWAP when applied twice). In platforms with ZZ interaction Hamiltonian, such as superconducting systems of Josephson flux qubits and NMR quantum systems, the physical gate is the CPhase gate, which is identical to the CNOT gate up to single qubit rotations. In platforms with XY interaction Hamiltonian, such as capacitively coupled Josephson charge qubits (e.g., transmon qubits), the 2-qubit physical gate is iSWAP gate. For trapped ion platforms with dipole-chain interaction, two popular physical 2-qubit gates are the geometric phase gate and the XX gate.

The quantum processor 230 can be continuously driven by external physical operations to any state in the space spanned by the logical states. The physical operations, called control fields, are specific to the underlying system, with control fields and system characteristics controlling a unique and time-dependent quantity called the Hamiltonian. The Hamiltonian determines the evolution path of the quantum states. For example, in superconducting systems such as the example quantum computing device 132, the qubits 232 can be driven to rotate continuously on the Bloch sphere by applying microwave electrical signals. By varying the intensity of the microwave signal, the speed of rotation of the qubit 232 can be manipulated. The ability to engineer the system Hamiltonian in real time allows the quantum computing device 132 to direct the qubits 232 to the quantum state of interest through precise control of related control fields. Thus, quantum computing may be achieved by constructing a quantum system in which the Hamiltonian evolves in a way that aligns with high probability upon final measurement of the qubits 232. In the context of quantum control, quantum gates can be regarded as a set of pre-programmed control fields performed on the quantum processor 230.

In the example embodiment, the QaO server 110 may perform a compilation and optimization processes that are configured to convert the quantum program (e.g., from source code) into an optimized physical schedule 204. The optimized physical schedule 204 represents a set of control instructions and associated schedule that, when sent to the quantum computing device 230 as optimized control pulses 220 (e.g., the pre-programmed control fields) by a signal generator 210, cause the quantum computing device 230 to execute the compute job 202, thereby generating an execution result 222. In the example embodiment, the quantum computing device 132 is a superconducting device and the signal generator 210 is an arbitrary wave generator ("AWG") configured to perform the optimized control pulses 220 on the quantum processor 230 (e.g., via microwave pulses sent to the qubits 232, where the axis of rotation is determined by the quadrature amplitude modulation of the signal and where the angle of rotation is determined by the pulse length of the signal). It should be understood that other quantum computing architectures may have different supporting hardware.

In the example embodiment, for quantum-based requests 140, the QaO server 110 may take a quantum program as input from a request 140, apply a series of compilation and optimization processes to produce control pulses (e.g., the optimized physical schedule 204) that implement the compute job 202 on the quantum computing device 132. Such compilation and optimization processes may include, for example, breaking up the logical operations of the quantum program into subsets, or blocks of qubits 232 (and their associated operations) such that the QaO server 110 is able to generate adequate optimization solutions for the subset of instructions, addressing parallelism problems inherent in breaking up the logical operations into blocks, and optimizing the logical operations based on the strengths and weaknesses of the underlying physical hardware.

Figure 3:
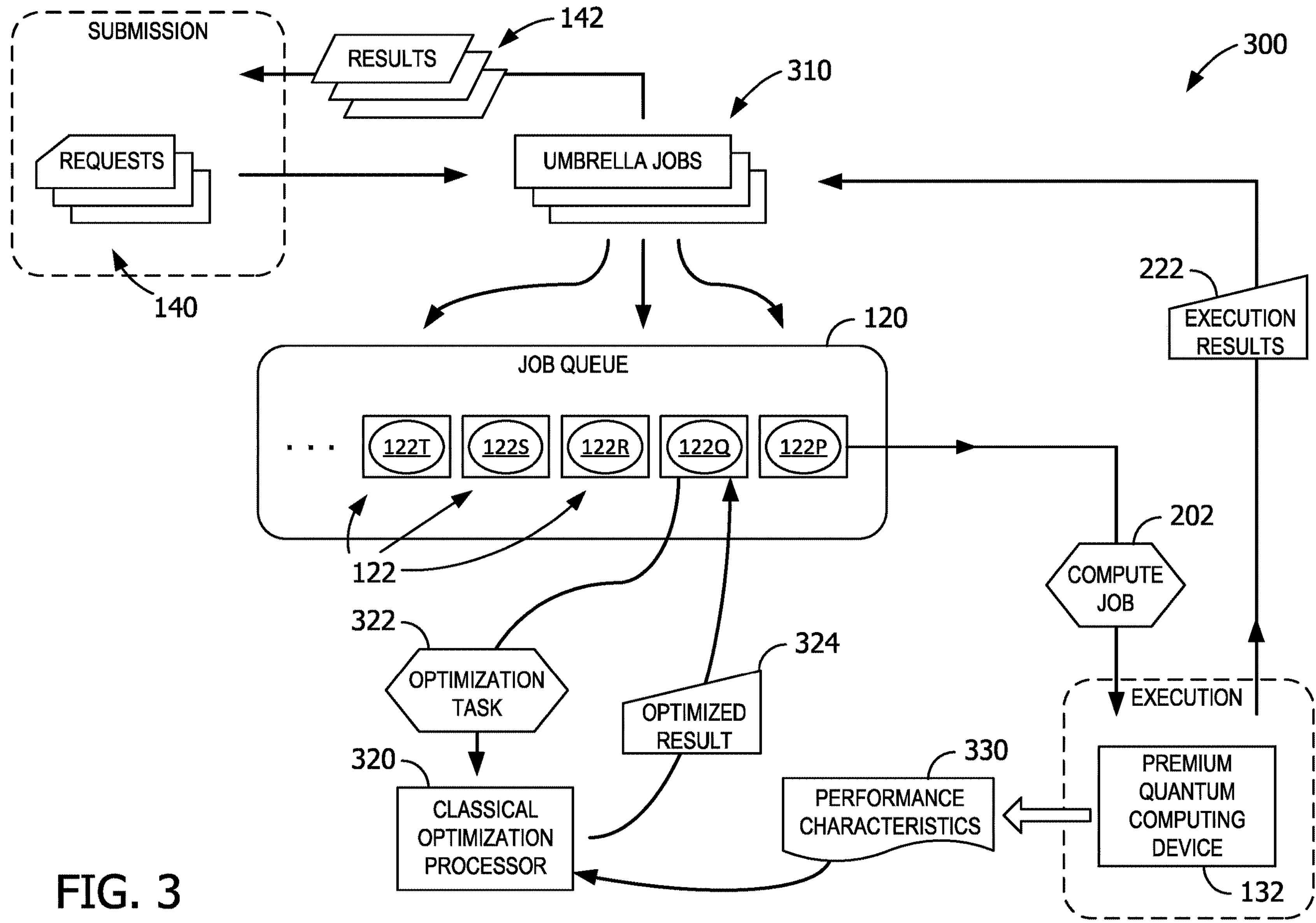

FIG. 3 is a data flow diagram 300 illustrating example queue management, preparation processes, and execution operations performed by the QaO server 110 shown in FIG. 1. In the example embodiment, the QaO server 110 manages a single job queue 120 that is dedicated to one particular premium quantum computing device 132, but it should be understood that multiple job queues 120 or dedicated or shared job queues 120 may be provided. The term "preparation operations" is used herein to refer to compilation and optimization processes performed by the QaO server 110 that are configured to prepare the request 140 prior to execution, or between multiple executions associated with the request.

During operation, and as described above in reference to FIG. 1, the QaO server 110 receives job requests 140 from one or more client devices 144 (shown in FIG. 1). Upon receipt of a request 140, in the example embodiment, the QaO server 110 establishes an umbrella job 310 for each request 140. This umbrella job 310 includes input data from the request 140 (e.g., source code, configuration parameters, data, or the like), as well as other data that may be used to manage processing of the request 140. "Source code," in the context of quantum applications, can include non-compiled or intermediary components of the underlying quantum application in various forms, such as, for example, a statically compiled quantum circuit (e.g., in the form of an execution sequence, a graph of quantum gates on particular qubits of the device), initial layout selection, routing mapping, execution schedule, pulses or pulse level control commands, a pulse schedule (e.g., as with OpenPulse), or the like.

During processing, the execution engine 118 sends jobs 122 to the premium computing devices 132, 134 for processing. Upon complete processing of the request 140, the QaO server 110 transmits results 142 of the request 140 back to the requesting client 144. In some embodiments, the request 140 may include source code for a quantum program (e.g., uncompiled source code), and may include other data such as configuration parameters (e.g., which dynamic characteristics of the quantum computing device 132 can be allowed to influence optimization of a job 122), input data used by the quantum program, and metadata associated with the request 140, such as hardware requirements or other execution requirements. In some embodiments, the request 140 may include intermediate components of the quantum program, such as a minimally compiled quantum program (e.g., a compilation of the quantum program that is sufficient for the minimum required circuit success), a circuit compiled based on the static characteristics of a particular quantum computing device 132, or a pulse schedule (e.g., in the case of pulse based execution). Results 142, in the context of quantum applications, may include a distribution of the different output bitstrings of the circuit which are measured over each execution on the underlying quantum computing device 132 (e.g., results from the various "shots" performed during execution).

Each individual request 140 and their associated umbrella job 310 may generate one or more jobs 122 that are added, by the QaO server 110, to the job queue 120. Each job 122 encapsulates a single circuit or a batch of circuits that can be executed on a quantum computing device 132, where the circuit(s) include a list of instructions bound to some registers and having a number of gates spread out over a number of qubits 232. During execution, each circuit in a given job 122 may be reexecuted a specified number of times ("shots"). Some jobs 122 may be completely independent of each other (e.g., belonging to different quantum problems) but may be queued back to back. Some jobs 122 can be dependent on each other (e.g., belonging to the same quantum problem), but may be queued far apart. Some jobs 122 may be configured as "batch jobs," or jobs 122 in which multiple quantum circuits are grouped together. In some embodiments, the scheduling engine 114 controls the sequence of jobs 122 in the job queue 120 (e.g., via intelligent control logic). In some embodiments, the ordering of jobs 122 on the job queue 120 may be influenced, at least in part, by the user (e.g., via user control of virtual queues discussed below with respect to FIG. 4). The circuits within a batched job are treated as a single job 122 on the queue 120 such that all of the quantum circuits are executed successively during a single compute job 202, perhaps with multiple shots for each circuit.

Some requests 140 are completed through execution of a single job. Such requests 140 are referred to herein as "simple requests." For example, a simple job may result in one job 122 being added to the queue 120, sent as a single compute job 202 to the quantum computing device 312, and resulting in a single execution result 222 to complete the request 140. Other requests 140 may require multiple jobs 122 to complete the request 140. Requests 140 requiring multiple jobs 122 are referred to herein as "complex requests." For example, some quantum applications are iterative in nature, requiring multiple jobs 122 to be performed as the algorithm approaches a solution (e.g., Variational Quantum Eigensolver (VQE), which uses $O(1/\epsilon^2)$ iterations of depth-O (1) circuits, where $\epsilon$ is the target precision). Some quantum applications are composite in nature, requiring multiple jobs 122 to provide a complete result. For example, at each iteration of VQE, an ansatz may be made up of multiple terms, where each term is a quantum circuit. Since each of these terms is a separate quantum circuit, solving them is performed individually. Thus, an ansatz of N terms may cause the QaO server 110 to create N jobs 122 on the queue 120 per iteration of the VQE.

For quantum-based requests 140, there are multiple preparation operations that may be performed while building a quantum circuit before it is sent (e.g., as a compute job 202) to the quantum computing device 132 to be executed. Such preparation operations may include, for example, layout selection (e.g., mapping logical qubits of a quantum application to the optimal physical qubits 232 of the quantum computing device 132), routing (e.g., mapping a circuit onto a backend topology via insertion SWAPs), scheduling (e.g., timing the execution of particular gates in the circuit), and compilation (e.g., converting source code into gates from among the gate operations which are allowed by the target computing device 132). These preparation operations can be performed via progressively improving algorithms and can, therefore, be performed at multiple levels of effort. Higher effort implies potentially better layouts, circuit routes, and schedules, at the expense of longer compilation times. Further, the "compilation time versus circuit benefit" gradient may be non-uniform and potentially flattens out over time (e.g., the time to achieve further improvements to the circuit may grow exponentially longer), but in some situations, it is possible that any of the optimizations may find better layouts, routes, or schedules later in the optimization process (e.g., after being plateaued for a time).

Figure 5:
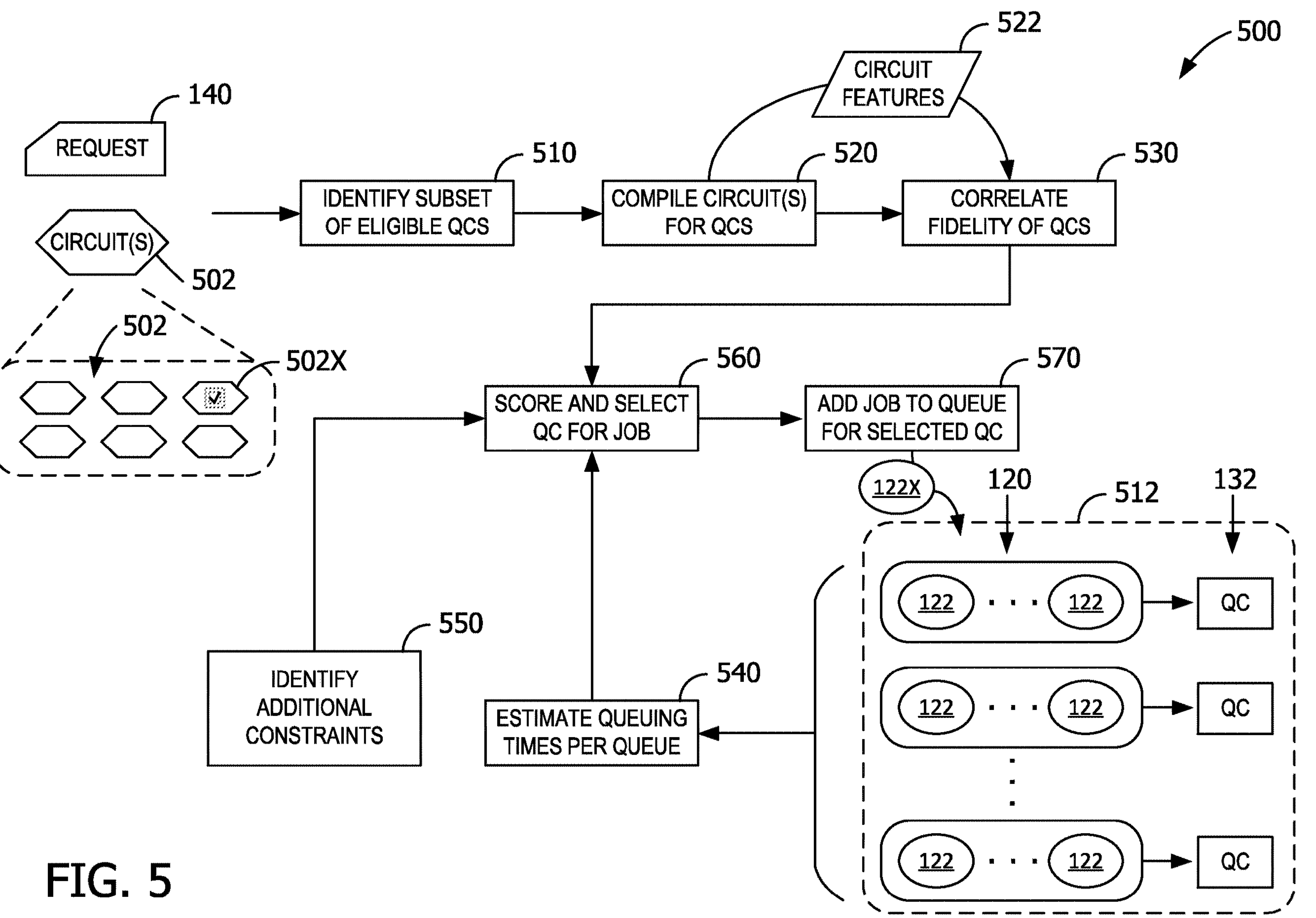

Accordingly, in the example embodiment, when a quantum-based request 140 is first received, the QaO server 110 performs initial preparation operations minimalistically for the request 140. In some situations, the client device 144 may perform such initial preparation operations, which may be submitted as part of the request 140. More specifically, prior to deployment of a first job 122 onto the queue 120, the QaO server 110 may perform an initial compilation of the quantum application (e.g., converting source code into gates for a virtual circuit based on gate operations allowed by the underlying quantum computing device 132) and may perform an initial layout selection, routing, and scheduling (e.g., scoring and selection of a particular QC 132, as shown in FIG. 5) sufficient for minimum required circuit success. A layout pass associates a physical qubit in the device 132 to each virtual qubit of the circuit. The QaO server 110 may apply a user-given initial layout for a request 140 or, if none is provided, the QaO server 110 may generate a trivial layout consisting of mapping the ith virtual qubit to the ith physical qubit, allocating any unused physical qubit as ancillary space. The QaO server 110 may then apply a pass manager to unroll the circuit to the desired basis and transform the circuit to match the coupling map. After compilation and layout, a routing step ensures that the physical circuit is transformed to actually be suited to the topology of the device 132 (e.g., including insertion of new gates through swaps). A scheduling pass is subsequently performed to generate a quantum operation schedule (or just "schedule") for the circuit. In some embodiments, the scheduling engine 114 may perform initial compilation and preparation operations prior to putting the job 122 on the queue 120. In some embodiments, the scheduling engine 114 may put the job 122 on the queue 120 prior to performing initial compilation and preparation operations and may, for example, set one or more readiness flags on the job 122 that track whether or not the initial preparation operations have yet been performed on the job. These readiness flags may be set once each of the minimal preparation operations are performed. In some situations, if the target computing device 132 for the job 122 changes, the scheduling engine 114 may reset the readiness flags, thereby causing the preparation operations to be re-performed. FIG. 5, below, provides additional embodiments that may be performed by the QaO server 110 and the scheduling engine 114 prior to placing new jobs 122 onto particular job queues 120.

In some embodiments, the QaO server 110 may use QISKIT, an open source framework and tool set (e.g., transpiler) for circuit model quantum programs promulgated by International Business Machines ("IBM," a New York corporation). In some embodiments, the QaO server 110 may use CIRQ, an open source framework and tool set developed by the AI Quantum Team of Google (Alphabet, Inc., a Delaware corporation). In some embodiments, the QaO server 110 may use ScaffCC, a tool configured to compile quantum applications written in Scaffold programming language and output a quantum assembly ("QASM") representation (e.g., compilation, analysis, and optimizations prior to conversion into machine-dependent physical-level operations).

Once the job 122 is added to the queue 120, further improvements and optimizations may be performed to that job 122 while the job 122 waits in the queue 120. Thus, the longer the queueing time, the higher the potential for improved circuit generation via further compilation effort in mapping, routing, and scheduling operations. Such in-queue optimization is suited to even long duration compilation. In the example embodiment, the steps of layout selection, routing, and scheduling may be performed via progressively improving algorithms and can therefore be performed at multiple levels of effort (e.g., extended processing times). For example, the optimization engine 116 may use the QISKIT transpiler to perform layout selection, routing, and scheduling passes. Extended processing time implies potentially better layouts, circuit routes, and schedules. The optimization time versus circuit benefit may be non-uniform and, as such, may flatten out over time. For example, the processing time to achieve latter percentages of circuit improvements may grow exponentially longer. Additionally, search algorithms for approximate quantum circuit synthesis can take minutes to hours. Not only are the synthesis time durations aptly suited to in-queue optimizations, possibly more so when queuing times are large, but further, these search algorithms are progressive in nature, meaning that some looser targets for approximation can be achieved prior to queueing and stricter targets can be achieved in queue.

In-queue compilations and other optimizations may be applicable to both gate-based and pulse-based jobs. Pulse compilations are typically longer than gate compilations and are more susceptible to "staleness," and thus may particularly benefit from in-queue compilations and optimizations. Further, the scheduling of quantum circuits to particular QCs 132 is also useful to both gate-based and pulse-based jobs as both approaches can benefit from machine selection, such as described in FIG. 5. For example, for gate-based jobs, the QaO server 110 may use considerations such as circuit depth or number of two-qubit gates when determining which particular QC 132 may be best for a particular job 122 (e.g., as factors in scoring). With pulse-based jobs, the QaO server 110 may, for example, use pulse duration, or gate or measurement error rates when determining which particular QC 132 to target for a particular job 122 (e.g., as factors in scoring).

In some embodiments, the QaO server 110 may perform selection of QCs 132 via an intelligent circuit construction and classical simulation support. For example, the QaO server 110 may construct classically stimulable versions of the target circuit and run this new circuit on QCs 132 of interest, as well as on a classical computer. These outputs may then be compared to obtain an estimate of the quality of service that the machines of interest might provide. Then those machines which are above a predetermined QoS threshold can be used for future runs of the target circuit or similar circuits.

In some embodiments, the scheduling engine 114 may track and maintain an estimated time to execution ("ETE") for the various jobs 122 on the queue 120, where the ETE for a given job represents an estimation of a remaining queuing time for the job 122 (e.g., how long the job 122 has before it will be sent for processing). As such, the scheduling engine 114 may use the ETE for a given job 122 to determine what, if any, optimizations to perform on that job 122, or how much processing time to allocate to a particular optimization task for that job 122. In some embodiments, the queuing time may be broken down among the different possible optimizations (e.g., based on heuristics or some analysis of the job 122, the circuits, or the device 132). Some quantum jobs may be homogeneous and, as such, may allow for a relatively accurate estimation of ETE. If ETE is not accurately known, the scheduling engine 114 may perform optimizations incrementally more aggressively at each optimization trial. For example, after each trial, the optimization engine 116 may capture and save a snapshot of the state. If the waiting time is about to end, the newest saved snapshot can be used and all pending or ongoing optimizations in the pipeline can be terminated. In some embodiments (e.g., with virtual queue management), the scheduling engine 114 may promote a different independent job of the user ahead of another job (e.g., if an ongoing optimization task is currently running for the overtaken job, if the overtaken job is not ready for execution).

In some embodiments, the QaO server 110 may perform other in-queue optimizations on jobs 122 in the queue 120. These additional in-queue optimizations may include, for example, combining 1-qubit or 2-qubit sequences, consolidating circuit blocks, replacing or cancelling specific gates, optimizing for crosstalk mitigation, or performing measurement error mitigation. Some such optimizations may be iterative and, as such, the amount of processing allocated to such optimizations may be made based on estimated queueing time. Such additional optimizations may reduce circuit depth, critical paths, or runtime, improve the quality of the circuits generated, or improve the potential for circuit success. Some in-queue optimizations may impact other components of a given job 122, which may cause the QaO server 110 to re-perform some aspects of job preparation. For example, if subsequent in-queue optimizations are made to layout selection, the QaO server 110 may automatically trigger reprocessing of routing or scheduling.

Compilation to the pulse level can be especially cumbersome and can consume several hours of compilation time. Considering that a considerable fraction of queueing times may be in the order of hours, and expected to grow in the future, the QaO server 110 may additionally perform in-queue pulse level compilation. Such in-queue pulse level compilation may be performed while the job 122 is on the queue 120 and prior to sending the compute job 202 to the quantum computing device 132 (e.g., in lieu of pulse level compilation performed on the control computing device 130). In one embodiment, pulse generation occurs just prior to quantum execution and, as such, all gate level optimizations in the queue 120 are not dealing with pulses. In another embodiment (e.g., OpenPulse style), the job 122 includes pulses right from the beginning and, as such, operations such as mapping, routing, and scheduling are not performed, but pulse-level optimizations may be performed (e.g., error mitigation techniques, such as error extrapolation in which the pulses are stretched to intentionally make the circuit worse). In still another embodiment, jobs 122 may support a combination of both gate-level optimizations and pulse-level optimizations. For example, initial gate optimizations may be performed while the job 122 is in the queue 120 and, after pulse generation is performed on the job 122 while in the queue 120, all other optimizations may be locked out and pulse-level optimizations may be performed on that job 122.

As mentioned above, when quantum circuits are compiled, they may be compiled in a device aware manner. While compilation may involve static characteristics such as device topology and device basis gates, compilation may also incorporate dynamic characteristics (e.g., performance characteristics 330) of the particular quantum computing device 132, such as gate or qubit fidelity. Such dynamic characteristics are dynamic because they may evolve over time. Such characteristics of qubits and gates may be recalibrated at some course granularity (e.g., once per day) and such calibrations may be non-uniform (e.g., one day's qubit fidelity may be very different from the next day's qubit fidelity). In other words, dynamic characteristics may be influenced by both the calibration, which may be done once a day and can have a different effect each time, or drift, where the characteristics of the device 132 are drifting over time, in between calibrations. For example, the optimization engine 116 may perform noise-aware routing or noise adaptive layout.

NISQ-era quantum machines may be affected by non-deterministic spatial and temporal variations in their characteristics (e.g., in terms of their one- and two-qubit error rates). For example, some quantum computers, from a spatial perspective, yield a coefficient of variation (e.g., ration of the standard deviation to the mean) to be in a range of 30-40% for $T_1/T_2$ coherence times, as well as nearly 75% for 2-qubit error rates, which may be indicative of wide variation across the machine. From a temporal perspective, some quantum computers may yield more than 2× variation in error rates in terms of day-to-day averages. These variations may be impacted by both day-to-day calibration of these machines as well as drift between calibrations.

As such, in scenarios of long queueing times, the dynamic characteristics which may have been accounted for at the time of an earlier compilation may be very different from the dynamic characteristics of the quantum computing device 132 at execution time. This may result in the quantum circuit being executed sub-optimally on the quantum computing device 132, thus leading to performance inefficiencies.

Accordingly, in the example embodiment, the QaO server 110 may monitor performance characteristics 330 of the quantum computing device 132 over time. For example, the QaO server 110 may perform course grained monitoring, fine grained monitoring, and/or speculative recompilations. Course grained monitoring may include monitoring for recalibration and, if a recalibration is triggered, perform partial or full recompilations on one or more jobs 122 on the queue 120 using current characteristics. Fine grained monitoring may include regularly measuring deviation in various characteristics of the quantum computing device 132 and triggering a partial or full recalibration of jobs 122 on the queue 120 when deviations are significant (e.g., when deviations exceed a predetermined threshold). Speculative recompilations include predicting drift in performance characteristics of the quantum computing device 132 and adapting the compiled circuit accordingly. Such optimizations may result in improvement to the quality of the circuits generated, thus improving the potential of circuit success during execution.

In some embodiments, the QaO server 110 processes complex requests (e.g., requests 140 that include multiple jobs 122 to complete). Such complex requests can include optimizations that are performed between jobs 122 (e.g., based on outputs of prior jobs 122 of the request). Such optimizations are referred to herein as "inter-job optimizations." Accordingly, inter-job optimizations may be especially beneficial as inter-job optimizations may not only improve the quality of the solution as a whole, but may also improve the processing efficiency from the perspective of the requester as well as from the perspective of the quantum service provider.

For example, VQE may be used to find the ground state energy of a molecule, a task that is exponentially difficult in general for a classical computer, but is believed to be efficiently solvable by a quantum computer. Estimating the molecular ground state has important applications to chemistry, such as determining reaction rates and molecular geometry. To solve such problems, VQE uses $O(1/\epsilon^2)$ iterations of depth-O (1) circuits, where $\epsilon$ is the target precision. The quantum circuit corresponding to each iteration of VQE is termed an ansatz. While many ansatz choices are possible, Unitary Coupled Cluster Single-Double (UCCSD) may be used in example embodiments.

Benchmarking the UCCSD ansatz for five molecules: H2, LiH, BeH2, NaH, H2O has shown that these ansatz are made up of multiple terms where each term is a quantum circuit. The number of such terms/circuits for these molecules may vary, for example, from 3 to 92 (max for H20). These numbers may increase for larger and more complex molecules. Further, the number of qubits per term/circuit varies (e.g., from 2 to 10) for these molecules (max for H20). As such, the per-term compilation time, summed up across all passes, is usually in the order of seconds. In general, both the circuit depth and number of ansatz terms in UCCSD scale as O(N4) in the circuit width.

Since, in the example embodiment, each of these terms is a separate quantum circuit, solving them is performed individually (e.g., each term corresponds to a separate job 122 on the queue 120). Thus an ansatz with N terms would launch N jobs 122 on the quantum machine, and per iteration of the VQE. As such, the total queuing time for this problem grows linearly with N and the number of iterations. Considering that even a single job 122 can experience considerable queuing time, these problems quickly become difficult to evaluate on any realistic deployment time scale. The queuing time is further worsened by the fact that the queuing systems often use algorithms such as "fair share," which deprioritize users with a large number of jobs. Thus, larger molecules with more ansatz terms and thus more jobs, are further delayed.

In order to reduce these time frames, the example embodiment leverages inter-job optimizations in combination with term truncation. Term truncation includes dropping some of the ansatz terms, if it is deemed that the solution provided by the initial terms is already sufficient for the problem of interest. By ordering the terms/jobs 122 in a priority order, which can be garnered from understanding the quantum problem at hand, earlier jobs 122 can be made to be more likely to contribute to forming the appropriate solution. Note that this is affected by both static and dynamic characteristics of the quantum computing device 132 (e.g., performance characteristics 330) as well as different aspects of the problem itself. Given N terms/jobs 122, if it is deemed that the first k jobs 122 are sufficient, then the other N-k jobs can be removed from the queue 120 and, if required, the next iteration of VQE can begin processing. This can be performed by post-processing the execution results 222 after completion, performing classical analysis (e.g., either at the user end or by the QaO server 110) and interacting with the other queued jobs 122. Overall, sufficient accuracy for the problem, given the machine at hand, can be obtained without wasting excess quantum resources (e.g., by executing jobs which are not effectively contributing to the solution significantly).

Additionally, certain aspects of the remaining k terms/jobs 122 may be adapted based on observations from the first N-k terms/jobs 122, if that is more suited to the problem at hand. As noted earlier, compilation for these terms are in the order of seconds, thus potentially suited to in-queue modifications. Further, it should be noted that term truncation may be used for other problems such as, for example, Hamiltonian simulation or other algorithms like Quantum Imaginary Time Evolution ("QITE").

Another example of inter-job optimizations involves requests 140 using Quantum Approximate Optimization Algorithm ("QAOA"). QAOA is an algorithm for generating approximate solutions to problems that are hard to solve exactly. QAOA is of particular interest in the near term because recent work has shown that it is computationally universal. Moreover, QAOA has shown experimental resilience to noise. For these reasons, QAOA is a leading candidate for quantum supremacy, the solution of a classically-infeasible problem using a quantum computer.

QAOA may be performed, in an example embodiment, as an alternating pattern of Mixing and Cost-Optimization steps. At each Mixing step, QAOA applies diffusion so that every possible state is explored in quantum superposition. At each Cost Optimization step, a bias is applied to boost the magnitudes of quantum states that minimize a cost function. Thereafter, measuring can yield an approximate solution close to optimal with high probability. The number of alternating Mixing and Cost-Optimization rounds is known as p. Similarly to VQE, QAOA is a guess-check-repeat algorithm. In the case of QAOA, the guesses correspond to Mixing magnitude during iterations 1-p and Cost-Optimization magnitude during iterations 1-p. Each ith mixing iteration is characterized by $\beta$ variational mixing parameters vector, while each ith cost-optimization step is characterized by $\gamma$ cost parameters vector, each of which has a length, p, and where the ith mixing iteration is characterized by the ith entry of the $\beta$ vector, and the ith cost-optimization iteration is characterized by the ith entry of the $\gamma$ vector.

One benefit for QAOA from in-queue optimization is in terms of classical pre-training cost. The search space for $\beta$ and $\gamma$ can be pruned using classical search based on some understanding of the problem at hand, prior to actual quantum execution. This pre-training can be performed while the job 122 is on the queue 120, thereby saving on overall application runtime via a one-time search-time reduction.

These benefits can be increased significantly via feedback based pruning of the search space. Evaluation of earlier QAOA rounds (e.g., at lower p values), can provide hints about how to prune the search space for future rounds. In this way, parameters can be optimized efficiently to suit both the needs of the problem as well as suit the characteristics of the quantum computing device 132. Performing these optimizations while the job 122 is queued may save considerable execution time on each round/iteration (e.g., resulting in scaling benefits with larger problem sizes) and may also better capture the characteristics of the quantum computing device 132. Similar to VQE, compilation times per QAOA round can be reduced, in some embodiments, to as low as 10s to 100s of seconds (e.g., via partial compilation optimizations), which are then very suitable for in-queue optimization.

Potential for similar benefits can also be explored in Recursive Quantum Approximate Optimization Algorithm ("RQAOA"), which is basically just N sequential instances of QAOA, each of which solve for only one vertex instead of the whole problem graph. In fact, RQAOA might be even more suited to in-queue optimization given that it requires O(N) more jobs compared to vanilla QAOA.

Another example of inter-job optimizations involves Zero-Noise Extrapolation ("ZNE"). In ZNE, a quantum program is altered to run at different effective levels of processor noise. The result of the computation is then extrapolated to an estimated value at a noiseless level. To achieve the different noise levels, 'stretch factors' are used to alter the original quantum circuit. Generally, different stretch factors used are agnostic to the particular machine characteristics. With the use of in-queue job optimization, if multiple stretched jobs 122 are queued one after the other, later jobs 122 can be altered or removed based on feedback from prior stretched jobs 122, effectively improving the quality of ZNE, as well as the overall execution time.

While FIG. 1 and FIG. 3 are illustrated with respect to a single job queue 120 and a single quantum computing device 132, it should be understood that the cloud processing system 100 may support multiple quantum computing devices 132. In such embodiments, the system 100 may allow requesting users to target a particular quantum computing device 132. While capabilities of quantum machines can be different in terms of qubits and quantum volume, it may be the case that a number of quantum computing devices 132 can exhibit similar execution characteristics across many applications. Thus, in some embodiments, requests 140 may not necessarily target a specific machine, and instead may target a set of quantum computing devices 132 (e.g., based on pre-defined pools of devices 132, based on devices 132 that meet some specific constraints or provides some machine preferences or priorities). In such a scenario, jobs 122 may be dynamically moved between different job queues 120 or assigned to different quantum computing devices 132 (e.g., based on availability/expected queuing times, satisfying specific metrics such as maximizing overall machine utilization/effective quantum volume/fidelity, and so forth). In the case a job 122 is dynamically reassigned to a different queue 120 or device 132, its compiled quantum circuit may be re-optimized for the new target device 132. This can again be performed with in-queue optimizations. As described in single machine scenarios, optimizations can be influenced by machine characteristics, inter-job analyses and so forth. Somewhat orthogonal, but of benefit to the above, is the exploration of machine-agnostic compilation and/or machine-specific partial recompilation. The latter can be performed in-queue after a specific device 132 for execution is decided by the system 100. This may involve delayed translation from device-independent IR to basis gate instructions, depending on the actual device 132 of interest and its basis gates.

In some embodiments, the cloud processing system 100 may provide dedicated access to particular premium computing devices 132, 134. If a requesting user desires sole access to a specific quantum computing device 132, the requesting user can reserve a dedicated mode of machine usage. Job queueing is for other requesting users is blocked (e.g., from the job queue 120 for the reserved device 132) when the device 132 is in dedicated mode. This therefore allows users to implement algorithms where input circuits are conditioned on previous results (e.g., iterative and near-time compute methods) without having to wait for other users' jobs 122 to execute. If the dedicated mode is reserved for multiple users, then a single user's jobs 122 may be queued behind those of other users, and the execution may be queued as first-in/first-out. Dedicated mode can also substantially benefit from in-queue optimization. Optimal utilization of the dedicated machine/queue is especially important considering the high costs to reserve to a single customer. Further, machine characterization and inter-job optimization are more feasible since all the jobs in the queue can be globally managed and potentially allowed to communicate with one another. For example, characterization jobs can be easily inserted as and when required to capture varying performance characteristics 330 of the device 132, which will help with both inter-job as well as inter-job optimization.

In scenarios of dedicated access and/or with empty physical machine queues, the wait time between jobs can considerably reduce. For a particular optimization (e.g., especially inter-job optimizations) to be effective, it may be required that job i and job j have at least T time between their execution so that information obtained from job i can be processed so as to be able to optimize job j. In case of less than time T separation between these jobs, this separation can be artificially induced via multi-threading. In multi-threading, jobs from two different processes or applications (e.g., sets of jobs which may be independent of one other) can be appropriately intertwined so as to guarantee sufficient time between jobs of the same process or application if required. Multi-threading can be fine-grained or coarse-grained as well as job-cognizant or job-agnostic. While some aspects multi-threading can be employed without user-managed virtual queues, the presence of virtual queues provides considerably more control, especially towards job-cognizant greedy multi-threading.

It should be noted that batching of multiple circuits into a single quantum job can be thought of as one form of achieving multi-threading. The execution time of a single job 122 typically scales linearly with the number of circuits in that job's batch. For example, the more circuits included in the batch, the longer the quantum execution time is needed (e.g., since the jobs in the batch are executed individually one after the other). Thus, one way to control the time between jobs (e.g., the same goal as multi-threading) is via controlling the number of circuits in the job's batch. Independent circuits from one problem or multiple problems can be executed in conjunction, thus creating a longer time gap between dependent circuits, potentially allowing effective post-processing of the older job before executing the younger dependent one.

In-queue optimization can potentially be performed within a batch as well. Considering that circuits in a batch of considerable size are executed one after the other, it is possible that earlier circuits in a batch could be used to optimize later circuits within the same batch, resulting in more optimal fine-grained optimization. This may benefit from further fine grained control at the machine interface.

In some embodiments, the system 100 supports multi-programming for quantum computing devices 132, executing two or more smaller quantum circuits in conjunction on a larger quantum device 132. The number of parallel executions is dependent on the number of qubits required by each circuit, the number of qubits in the device 132, the machine topology/connectivity, the qubit error rates, and the like. In-queue optimization is suited to both uniprogramming and multi-programming and can have even more significant benefits for the latter. If multi-programs are built for execution dynamically among statically unknown circuits (e.g., for maximum efficiency), there will be significant potential to optimize each circuit in the multi-program based on which qubits/device area the circuit is eventually assigned to, as well as in terms of (minimizing) interactions among the neighboring circuits. Such optimizations can be performed in the queue 120.

Feedback from older jobs, which may be post-processed and used to optimize younger jobs, can be made faster by incorporating mid-circuit measurement. Mid-circuit measurement allows qubits to be selectively measured at a point other than the end of a quantum circuit. The quantum information of a measured qubit collapses to a classical state (zero or one), but the nonmeasured qubits retain their quantum state. Such forms of early measurements can aid in in-queue optimization, particularly when turnaround time is low (e.g., if in-queue optimization is pursued within a job batch).

In some embodiments, the cloud processing system 100 provides in-queue optimization for classical computing requests 140. Recent analysis of supercomputer queuing times has shown that queuing times have increased by more than 10× in the past decade, with median wait times as high as 2.5 hours. Since queuing time is high, there is tremendous opportunity to perform tasks while enqueued.

In comparison to quantum jobs, wait times may be more difficult to predict as they can vary widely with the number of jobs, the type of the particular job, as well as other jobs in the entire system. While multiple prediction schemes have been employed, getting accurate estimations is challenging. Secondly, in the quantum setup, the capabilities of the "server" (the quantum machine) and the "client" and/or the "co-processor" (which are classical machines) are drastically different. So clearly there are classical compile time optimizations performed on the client and/or co-processor while the job is queued for quantum execution on the server. On the other hand, in the classical scenario, all of these machines are classical. But at the same time, the capabilities of these classical machines would be vastly different. The server would consists of multiple (potentially 100s-1000s) nodes of high performance compute units while the client and/or coprocessor would likely have less than 10 compute nodes of low/medium performance compute units. Thus the optimizations performed on the latter should be light-weight and cannot be optimizations that are similar in compute requirements to the actual job itself.

Actual job execution times are often grossly overestimated by users. For example, 50% jobs consumed 65% or less time than the requested wall time, potentially meaning that jobs are not instrumented for a more exact estimation of run times, and/or jobs are not deterministically optimized to the best extent possible. Such optimizations which might be "nice to have" but not essentially required can be performed if there are long waiting times in the queue. Similarly, there is significant benefit from performing resource estimations on the fly as resource estimations optimized to the entire system's load are beneficial to system throughput. Such estimations can be performed repeatedly and/or at different levels of detail depending on (remaining) queuing time.

Similar to quantum inter-job optimizations, there are classical use cases wherein a single application is made up of multiple job executions. Queuing only one job at a time may result in considerable delay between the executions of the different jobs in the application, leading to considerable increases in overall execution time. Thus, multiple jobs can be queued up in sequence on the job queue 120. In some use cases, there is potential to optimize latter jobs based on feedback from earlier jobs of an application. Example use cases for inter-job optimization are the domain of machine learning driven approaches for the simulation and modeling of molecular systems and beyond. Simulations of physical phenomena typically take 45-60% of total supercomputing time. Performing traditional coarse-grained compute+analytics with significant data movement to memory quickly becomes infeasible. Thus, more fine-grained feedback based techniques are desired. Such techniques are suited to in-queue optimization wherein feedback from earlier jobs can be used to perform simple optimization on later queued jobs. Reinforcement learning for molecular dynamic simulation is one specific example of the above.

Some optimizations may not be performed dynamically at compile time but may need to be performed at runtime in a hardware-cognizant manner. For example, parallel and distributed applications are difficult to optimize because their performance depends on the interactions between distributed tasks and the resources available to each task. In such dynamic and unpredictable settings, compile-time optimizations may be augmented with runtime optimizations. In the case of resource allocation being allowed to change over time, as the job moves up the queue for execution (e.g., to optimize for instantaneous overall system throughput), application runtime optimizations can be performed on the queue after the last possible resource allocation.

In the age of heterogeneity and accelerators, the future computing cloud/super-computing systems may consist of a sea of heterogeneous resources, each of which are dynamically reconfigurable and/or wherein a cluster of resources suited to a task can be dynamically configured. Applications may be optimized dynamically to suit the dynamic configuration of resources. For example, in field-programmable gate array ("FPGA")/tensor processing unit ("TPU") based compute clusters, it can be envisioned that applications can be synthesized/compiled to suit the final target heterogeneity while the job is on the queue.

As chip designers attempt to reduce supply voltage to meet power targets, parameter variations are a serious problem. Environment induced variations which affect the functioning of a processor fall into three categories: process, voltage and temperature. Supply voltage and on-chip temperature are dynamic variations which vary with workload and environment. Voltage variations result in current fluctuations on the order of 10s to 100s of cycles and can also exacerbate thermal hot spots. Thermal variations cause changes to leakage current and restrict permissible voltage and TDP in the chip's environment.

In-queue optimizations can include those that are cognizant of dynamic variation characteristics. Effect of variations can be controlled by reduced micro-architectural activity which can be achieved by reducing resources allocated to all jobs or by intelligent reorganization of resources according to system optimality. These optimizations can be performed as late as possible so that the latest possible effect of variations can be incorporated in the job optimization.

The quantum optimizations described herein may involve classical optimizations are performed by the client device 144 or via access to a co-processor. In targeting real world applications, the complexity of classical-quantum algorithms like VQA grow enormously. For example, even a small H2O molecule has nearly 100 quantum circuits/parameters. It is expected that as the complexity of these algorithms grow, considerable resources would be required for both the quantum as well as the classical components. For instance, for a QAOA algorithm, high complexity would mean more qubits and a deeper circuit from a quantum perspective, as well as a more arduous optimization scheme and higher compute requirements to tune the QAOA parameters. In such scenarios, it would be expected that both the classical as well as quantum optimizations will be performed on scarce resources on the cloud. Thus, there will be queues to access both the classical as well as quantum resources. In such a scenario there is room for in-queue optimization for both the classical as well as the quantum resources. Both sets of optimizations discussed earlier are suited to this hybrid model.

Figure 4:
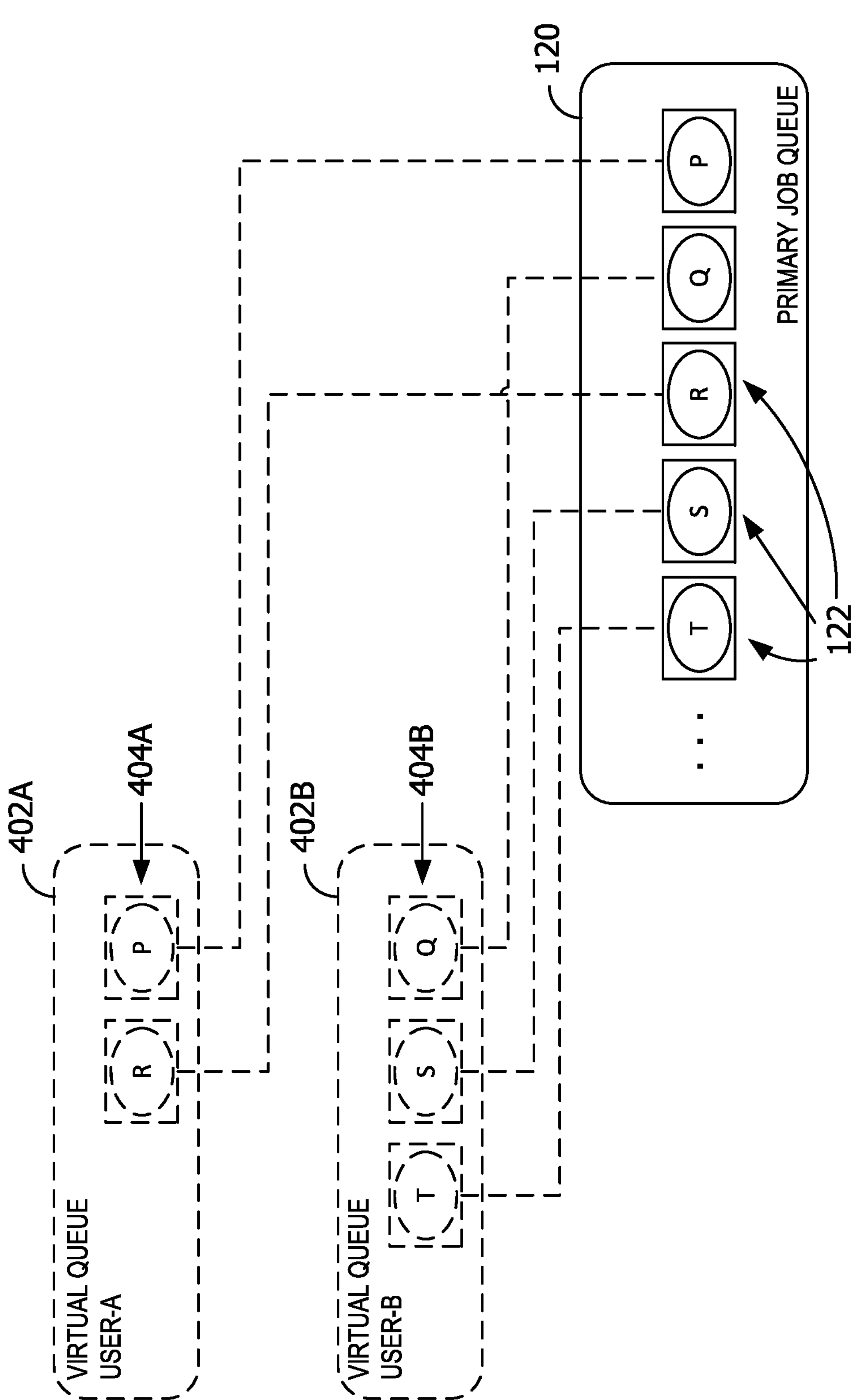

FIG. 4 is a diagram of example virtual queues 402 that may be provided by the cloud processing system 100. To allow for more user flexibility (e.g., beyond the optimizations described above), the system 100 may provide user-managed virtual queues 402. In the example embodiment, the cloud processing system 100 has established a virtual queue 402A for a requesting user, "User-A," and another virtual queue 402B for another requesting user, "User-B." Through a virtual queue API, each requesting user is granted a virtual queue 402 which can be queued up with jobs 404 that are under the control of the user, in terms of relative ordering, adding/removing jobs 404, modifying jobs 404, etc. Each of these virtual queues 402A, 402B, contain jobs 404A, 404B, respectively, of their associated requesting user. Each of these jobs 404 represent a link to one of the jobs 122 currently on the associated job queue (or "physical job queue") 120. The virtual queue 402 is distributed along the machine's actual physical job queue(s) 120 (e.g., based on traditional priority schemes like fairshare, based on hardware targeting, or the like). The physical job queue 120 itself can be agnostic to the existences of the user virtual queues 402. Virtual-queue based prioritization algorithms at the physical layer can also be implemented.

In some embodiments, a particular user, such as "User-A," can have multiple virtual queues 402 and each of their virtual queues 402 may target different quantum applications or different quantum computing devices 132 or classical computing devices 134. In some embodiments, the QaO server 110 may provide a graphical user interface ("GUI") that allows the user to configure, maintain, manage, or otherwise administer aspects of their virtual queues 402 and their associated jobs 404, and may provide data about the underlying job queue(s) 120 supporting those virtual queues 402. In some embodiments, components of the virtual queues 402 may be independent or may be dependent and the virtual queues 402 may provide task-controlled barriers to facilitate inter-queue dependencies. The QaO server 110 may allow the user to reorder their jobs 404 within their own virtual queues 402, which may result in the scheduling engine 114 reordering those associated jobs 122 on their underlying physical job queues 120.

FIG. 5 is an example method 500 for device selection when receiving a new request 140 for quantum processing. In the example embodiment, the method 500 is performed by the QaO server 110 (e.g., by the scheduling engine 114 and the cloud processing system 100 shown in FIG. 1) when a new request 140 is received and before a new job associated with that request 140 is added to any particular job queue 120 for execution on a particular QC 132. More specifically, in this example request 140, the request 140 does not specify a particular QC 132 on which to target execution, but rather the QaO server 110 performs the method 500 to identify which particular quantum computing device (or "QC" in FIG. 5) 132 to use to execute the request 140 from a set of QCs 132 managed by the system 100.

In the example embodiment, the request 140 includes or otherwise identifies one or more circuits 502 associated with the request 140 (e.g., as a batch of circuits 502 for the request 140). These circuit(s) 502 may be included in the request 140 or may be generated by the QaO server 110 (e.g., compiled from source code or the like). At operation 510, the QaO server 110 identifies a subset of QCs that are eligible candidates to consider for this particular request 140. For example, from all of the QCs 132 managed by the system 100, the QaO server 110 may identify a subset 512 of those QCs 132 by eliminating any QCs 132 that are not capable of, or are otherwise excluded from consideration for execution of this request 140 based on, for example, hardware limitations relative to the request 140 (e.g., the number of required qubits to execute the circuit(s) 502 relative to the number of available qubits on each particular QC 132), or service level considerations (e.g., limitations predefined in a service level agreement, user account configuration, predefined queuing time limitations, or the like), or limitations within the request 140 (e.g., user-specified restrictions, such as limiting to just ion trap QCs 132 or superconducting QCs 132, or the like). The QaO server 110 may limit QCs 132 based on, for example, a number of qubits provided by the QC 132, average gate error rates across the QC 132, average measurement error rates across the QC 132, average error rates across different subsets of qubits, historical data about fidelity of the QC 132, based on threshold queuing times (e.g., QCs 132 with a current queue time exceeding a particular threshold may be excluded at this stage), calibration cycle details (e.g., QCs 132 that are scheduled to be calibrated in the near future may be excluded at this stage), historical data about QC usage trends, QC utilization data (e.g., a percentage of total qubits of a particular QC that would be used by a particular job), and/or aspects of QC topology.

At operation 520, in the example embodiment, the QaO server 110 compiles the circuits 502 for each of the candidate QCs 132 in the subset 512 of QCs. Compilation of circuits 502, at this stage, creates compiled circuits for each of the QCs 132 of the subset 512, and more specifically, for each particular architecture of each QC 132. In some embodiments, the circuits 502 for a given request 140 may include many circuits (e.g., a batch of circuits 502), and the compilation of circuits 502 at operation 520 may include compiling all of the circuits 502 for that request 140 and aggregating (e.g., via average, min, max, or some percentile) for each machine-job pair. This exhaustive approach can be resource consuming since requests 140 can contain hundreds of circuits, thus causing hundreds of compilations. To reduce the fidelity scoring, in some embodiments, the submitting user may elect to identify one or more particular circuits 502X as a part of the request 140 that the user deems to be representative of the batch of circuits 502, and the QaO server 110 may compile only those representative circuits 502X for fidelity scoring for each candidate QC 132 at operation 520. In some embodiments, the QaO server 110 may automatically select one or more circuits 502X for fidelity scoring (e.g., randomly). In some embodiments, the submitting user may identify which circuits 502X and how many of those circuits 502X to identify for fidelity scoring. This selection of a representative circuit 502X eases compilation overheads for the compilation and analysis of this method 500.

Compilation of the circuits, in the example embodiment, allows the QaO server 110 to extract certain circuit features 522 for each of the compiled circuits. Circuit features 522 can include, for example, circuit depth (e.g., the longest sequence of high error gate in the circuit). Such features 522 for each circuit 502 may be impacted by features of the particular QC 132 for which the circuit 502 was compiled (e.g., a particular architecture or topology of the QC 132), and thus some circuit features 522 may be extracted after the compilation. For example, circuit depth in a well connected QC 132 may be lower than circuit depth in a less well connected QC 132, for the same circuit. In the example embodiment, the circuit features 522 include circuit depth, average CX error over the circuit, average CX in the circuit critical path, and readout errors on the measured qubits. In some embodiments, the circuit features 522 may include additional features such as 1*q* gate errors.

In the example embodiment, these circuit features 522 are extracted and used for fidelity correlation. At operation 530, the QaO server 110 uses these circuit features 522 of the QCs for these circuits 502 to determine a correlation between the circuit features 522 and the expected fidelity of the execution of the circuits 502 on each particular QC 132. Fidelity, here, represents an approximation of how likely the execution of the circuit will achieve a correct output on this QC 132 (e.g., a probability of successful output on execution). During operation 530, the QaO server 110 is generating fidelity predictions, or "fidelity scores," for the circuits 502 on each of the QCs 132. These fidelity scores are subsequently used as one factor in assigning this job 122X to a particular QC 132, where a higher fidelity score for a particular QC 132 is preferred over lower fidelity scores on other QCs 132. In the example embodiment, a fidelity scoring model for fidelity correlation is built as a product of linear terms:

$$F_n = \prod (a_i + b_i * x_i)$$

where $F_n$ is the fidelity score of job n, $x_i$ is the feature, and $a_i$ and $b_i$ are the tuned coefficients.

In the example embodiment, in addition to the fidelity estimations, the QaO server 110 uses two additional factors when assigning the job 122X to a particular QC 132. At operation 540, the QaO server 110 estimates current queuing times for each job queue 120 of each of the candidate QCs 132. These queuing times represent an estimation of how long the job 122X would take to move through the job queue 120 and be executed on the particular QC 132. Lower queuing time estimates for a particular job queue 120 are preferred over higher queuing times of other job queues 120.

In the example embodiment, an execution time prediction model is built as a product of linear terms:

$$E_n = \prod (a_i + b_i * x_i)$$

where $E_n$ is the execution time score of job n, $x_i$ is the feature, and $a_i$ and $b_i$ are the tuned coefficients. In the example embodiment, the features of the execution time prediction model include batch size, the number of shots, circuit depth, circuit width, total number of quantum gates, and machine overheads (e.g., size and memory slots required). The QaO server 110 computes an execution time for each job 122 on a given queue 120 using the above execution time prediction model to determine how long the queuing time is for that particular queue 120. The estimate of the queuing time for each particular queue 120 is:

$$Q_M = \sum^{m} E_i$$

where QM is the queuing time on the $M^{th}$ QC 132, $E_i$ is the execution time of the $i^{th}$ job in the queue 120 of that QC 132, which has a total of m jobs currently on the queue 120.

In the example embodiment, the QaO server 110 uses the fidelity scores and the queuing times for selecting a particular QC 132 for this request 140 (e.g., for job 122X) at operation 560. Maximization of a utility function provides a job schedule that balances between fidelity and queuing times. A balanced linear equation is used for the utility function:

$$QC \text{ Score} = \sum (a_i * x_i)$$

where $x_i$ is the feature (e.g., describing queuing time, fidelity score, QOS satisfaction, expected calibration crossover, or other feature) and where $a_i$ is the coefficient for that feature. The example embodiment uses queuing time together with fidelity score for each QC 132/job queue 120, but may use either metric alone, or may also use other features identified as additional constraints in operation 550. Other features may include, for example, QoS requirements applied to the request 140 (e.g., based on service level agreement or the like), impact of calibration of the QC 132 and staleness of compilations for the QC 132, user priorities, or improved machine utilization.

Further, the associated coefficients $a_i$ for each feature may be configured from the set [−1, 0, or 1] or may be statically or dynamically configured based on, for example, past performance, current system conditions, or the like. For example, in situations with low overall queuing times (e.g., where average queuing times for the selected subset of QCs 132 are below a predetermined threshold), the short wait times are less significant, and thus higher weight may be placed on high fidelity (e.g., on the QCs 132 with higher fidelity scores). In such situations, higher-predicted fidelity QCs 132 may tend to be routinely targeted, and thus may cause those QCs 132 to field more job executions. In some embodiments, the system 100 may be configured to weigh targeting other QCs 132 as the queuing times on those high-fidelity QCs increases. At higher system loads (e.g., higher average queuing times), the system 100 may sacrifice some fidelity for improvements in execution times as the utility function sends jobs 122 to lower-fidelity but lower-queuing-time QCs/job queues 132, 120.

In some embodiments, some factors of the QC score may be tailored by the user (e.g., through the factor coefficients), such as allowing for user-provided or user-specific coefficients of the various factors (e.g., where users can identify priorities for the particular requests, or priorities for all of their requests). Some embodiments may similarly allow administrators to tune some factors. In some embodiments, some factors may be dynamically configured (e.g., a machine learning model trained for a particular feature using historical performance data or performance characteristics 330, as supervised or unsupervised training, or the like).

As mentioned above, QCs 132 are periodically recalibrated. This recalibration tends to make the QCs more accurate just after calibration (e.g., providing higher job fidelity), but may tend to diminish in accuracy (e.g., changes in error rates) as time progresses. This situation of "decay" or "staleness" of device calibrations presents two problems for consideration. First, the fidelity predictions for a given request 140 may be impacted by how long it has been since each particular QC 132 has been recalibrated. Second, some jobs 122 assigned to a particular QC 132 may "cross over" a particular calibration cycle of that QC 132 (e.g., having been compiled prior to a recalibration of the QC 132, but then executing after the recalibration of the QC 132). The QaO server 110 may be configured to address each of these situations.

To address the staleness of the calibration cycle for each particular QC, for example, the QaO server 110 may include a calibration cycle feature in the scoring at operation 560 (or more directly as a modification of the fidelity scoring at operation 530) that integrates a calibration cycle time into the function. For example, the system 100 may track the last recalibration time of each QC 132 and may determine a "staleness time" for each QC 132 based on how long it has been since the last recalibration time. This staleness time may be used to adjust the fidelity score for that particular QC 132, or as a separate constraint in the utility function, thereby reducing the scores for QCs 132 as the staleness time increases. In some embodiments, the QaO server 110 may, additionally or alternatively, use a predicted time until next recalibration as a factor to the scoring. QCs 132 that are nearing the time of their next recalibration event may be weighted against putting a new job 122X on that QC 132. The QaO server 110 may also consider a difference between the predicted queuing time on a given queue 120 and the time until next recalibration, weighting the scoring against a particular QC 132 when that QC 132 has enough jobs 122 sufficient to occupy the QC 132 until the next recalibration. In other words, the score for that particular QC 132 may be lowered as the risk of causing this job 122X to be subject to a crossover no that QC 132 increases. This reduces the occurrences of crossover jobs based on scheduling. The term "crossover job" refers to jobs 122 that are queued for a particular QC 132 prior to recalibration but, for whatever reason, are not executed until after that QC 132 has gone through recalibration.

To address the calibration crossover situation for jobs 122 already on a particular queue 120, the QaO server 110 may coordinate when the calibration cycle occurs for some or all of the QCs 132. In some embodiments, the QaO server 110 may stagger calibration times of QCs 132 across the day. As such, some QCs 132 will be available, to the scheduling algorithm, for accepting jobs 122 that are not in risk of crossover. In some embodiments, the QaO server 110 may identify QCs 132 with a currently low queue time that are also getting close to a regularly scheduled recalibration time and preemptively flag that QC 132 for a recalibration (e.g., move up the regularly scheduled recalibration) in order to take advantage of the currently low queue for that particular QC 132. For example, if a particular QC 132 has a queue 120 that falls below a predetermined threshold (e.g., 10 minutes, 30 minutes of remaining jobs 122) and an upcoming scheduled recalibration time that is within a predetermined threshold (e.g., would normally be executed within the next 30 minutes, 60 minutes, 2 hours), then the QaO server 110 may flag that QC 132 for recalibration. Such flagging may cause that QC 132 to finish its existing queue 120, perform the recalibration, then reenter service.

In some embodiments, the QaO server 110 may schedule jobs 122 onto a particular QC 132 until the associated job queue 120 contains enough jobs 122 to reach or exceed the remaining time until recalibration (e.g., closing the queue 120 once the remaining time is accounted for), and the QaO server 110 may hold the recalibration of the QC 132 until the job queue 120 is exhausted, thereby avoiding crossover jobs. In some situations, when job crossovers do occur, the QaO server 110 may recompile crossover jobs and may re-queue the crossover jobs after compilation (e.g., perhaps with favored placement, once recompilation is complete). In some embodiments, if the machine noise profile for a particular QC 132 changes only minimally through a recompilation (e.g., with a delta less than a predetermined threshold), then the crossover job may not be recompiled (e.g., as the prior compilation is still expected to be good).

In some embodiments, the QaO server 110 may dynamically determine scheduled recalibration times for QCs 132 using historical data (e.g., queue times, crossover job performance). For example, some QCs 132 may experience less use during certain times of the day (e.g., as exemplified in lower queue times), and thus the QaO server 110 may identify shift the scheduled recalibration time for that QC 132 to that time of the day. In another example, crossover job count may be tracked by the QaO server 110 (e.g., for a particular QC 132 relative to past recalibrations) and the QaO server 110 may shift the scheduled recalibration time to times when less crossover jobs occur.

In the example embodiment, once a particular QC 132 and associated job queue 120 has been selected for the request 140, the QaO server 110 creates the job 122X and adds that job 122X to the associated queue 120 at operation 570. In embodiments where not all of the circuits 502 were compiled for the QCs 132 (e.g., during operation 520, when the user had specified a particular circuit 502X to use as a representative circuit for this request 140), the QaO server 110 may compile the rest of the circuits 502 for this job 122X and for this particular QC 132.

While FIG. 5 illustrates examples of QC selection and assignment of a particular job 122X to a particular QC 132 and associated job queue 120 when a request 140 is first received, it should be understood that this QC selection and assignment can occur in other situations as well. For example, and as described above in FIG. 3, some requests may use multiple jobs needed to complete the request (e.g., iterative jobs that get re-executed multiple times after analysis of execution results 222, or the like). As such, subsequent jobs 122 may similarly go through the QC selection process 500 shown in FIG. 5. Further, in some situations, the QaO server 110 may identify jobs 122 for reassignment (e.g., jobs 122 that were already assigned to a job queue 120 but that, for various reasons, are going to be reassigned). For example, in some embodiments, the QaO server 110 may reassign jobs for a QC 132 that has gone offline (e.g., for a recalibration event, unexpected outage, or the like), or to reduce queuing times for some QCs 132 (e.g., redistributing jobs 122 from high queuing time QCs 132 to other QCs), or in crossover situations. As such, jobs 122 that experience reassignment may be reprocessed using this QC selection process 500 and, in some situations, may be given favorable placement onto the new job queue 120 (e.g., based on when the reassigned job 122X was placed on the prior queue 120 versus the queuing times of jobs 122 on the newly selected job queue 120).

As will be appreciated based on the foregoing specification, the above-described embodiments of the disclosure may be implemented using computer programming or engineering techniques including computer software, firmware, hardware or any combination or subset thereof, wherein the technical effect is to compile and optimize a quantum program for a quantum processor. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These conventional computer programs (also known as programs, software, software applications, "apps", or code) include machine instructions for a conventional programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A quantum computing system providing quantum processing as a service, the quantum computing system comprising:

a first quantum computing device including a plurality of qubits; and a queueing and optimizations ("QaO") server including at least one classical processor and storing instructions that, when executed by the at least one classical processor, cause the at least one classical processor to:

create a first job queue that includes a plurality of jobs configured to be executed on the first quantum computing device;

receive, from a client device, a request for execution of a quantum program;

add a first job entry to the first job queue for the request, the first job entry includes a quantum circuit for a first job;

perform multiple incremental optimization processes on the quantum circuit of the first job while the first job is in the first job queue awaiting execution, the optimization process changes the quantum circuit to an updated quantum circuit;

transmit the updated quantum circuit to the first quantum computing device, thereby causing the updated quantum circuit to be executed by the first quantum computing device using the plurality of qubits;

receive, from the first quantum computing device, execution results from the execution of the updated quantum circuit; and transmit the execution results to the client device.

2. The quantum computing system of claim 1, wherein the instructions further cause the at least one classical processor to manage a plurality of job queues for job execution on one or more quantum computing devices including the first quantum computing device.

3. The quantum computing system of claim 2, wherein the plurality of job queues includes one or more virtual job queues, wherein each virtual job queue of the one or more virtual job queues is assigned to a particular user account, wherein the first job queue is a physical job queue that includes jobs from the one or more virtual job queues.

4. The quantum computing system of claim 1 further comprising a plurality of quantum computing devices that includes the first quantum computing device, wherein the first job queue supports execution of jobs on any of the quantum computing devices of the plurality of quantum computing devices.

5. The quantum computing system of claim 1, wherein the instructions further cause the at least one classical processor to:

determine an estimated time to execution for the first job; and configure the optimization process for the first job based on the estimated time to execution.

6. The quantum computing system of claim 1, wherein the instructions further cause the at least one classical processor to:

upon receiving the execution results from the execution of the updated quantum circuit, create a second job on the first job queue as an iteration of the first job; and perform an optimization process on another quantum circuit of the second job prior to execution of the second job.

7. The quantum computing system of claim 1, wherein the instructions further cause the at least one classical processor to perform multiple incremental optimization processes on each job of the plurality of jobs while the plurality of jobs are in the first job queue awaiting execution.

8. A method for providing quantum processing as a service, the method utilizes a first quantum computing device that includes a plurality of qubits, the method also utilizes a queueing and optimizations ("QaO") server that including at least one classical processor, the method comprising:

creating a first job queue that includes a plurality of jobs configured to be executed on the first quantum computing device;

receiving, from a client device, a request for execution of a quantum program;

adding a first job entry to the first job queue for the request, the first job entry includes a quantum circuit for a first job;

performing multiple incremental optimization processes on the quantum circuit of the first job while the first job is in the first job queue awaiting execution, the optimization process changes the quantum circuit to an updated quantum circuit;

transmitting the updated quantum circuit to the first quantum computing device, thereby causing the updated quantum circuit to be executed by the first quantum computing device using the plurality of qubits;

receiving, from the first quantum computing device, execution results from the execution of the updated quantum circuit; and transmitting the execution results to the client device.

9. The method of claim 8 further comprising managing a plurality of job queues for job execution on one or more quantum computing devices including the first quantum computing device.

10. The method of claim 9, wherein the plurality of job queues includes one or more virtual job queues, wherein each virtual job queue of the one or more virtual job queues is assigned to a particular user account, wherein the first job queue is a physical job queue that includes jobs from the one or more virtual job queues.

11. The method of claim 8 further comprising a plurality of quantum computing devices that includes the first quantum computing device, wherein the first job queue supports execution of jobs on any of a plurality of quantum computing devices.

12. The method of claim 8 further comprising:

determining an estimated time to execution for the first job; and configuring the optimization process for the first job based on the estimated time to execution.

13. The method of claim 8 further comprising:

upon receiving the execution results from the execution of the updated quantum circuit, creating a second job on the first job queue as an iteration of the first job; and performing an optimization process on another quantum circuit of the second job prior to execution of the second job.

14. The method of claim 8 further comprising performing multiple incremental optimization processes on each job of the plurality of jobs while the plurality of jobs are in the first job queue awaiting execution.

15. A non-transitory computer-readable medium storing instructions that, when executed by at least one classical processor, causes the at least one classical processor to:

create a first job queue that includes a plurality of jobs configured to be executed on a first quantum computing device that includes a plurality of qubits;

receive, from a client device, a request for execution of a quantum program;

add a first job entry to the first job queue for the request, the first job entry includes a quantum circuit for a first job;

perform multiple incremental optimization processes on the quantum circuit of the first job while the first job is in the first job queue awaiting execution, the optimization process changes the quantum circuit to an updated quantum circuit;

transmit the updated quantum circuit to the first quantum computing device, thereby causing the updated quantum circuit to be executed by the first quantum computing device using the plurality of qubits;

receive, from the first quantum computing device, execution results from the execution of the updated quantum circuit; and transmit the execution results to the client device.

16. The non-transitory computer-readable medium of claim 15, wherein the instructions further cause the at least one classical processor to manage a plurality of job queues for job execution on one or more quantum computing devices including the first quantum computing device, wherein the plurality of job queues includes one or more virtual job queues, wherein each virtual job queue of the one or more virtual job queues is assigned to a particular user account, wherein the first job queue is a physical job queue that includes jobs from the one or more virtual job queues.

17. The non-transitory computer-readable medium of claim 15, further comprising a plurality of quantum computing devices that includes the first quantum computing device, wherein the first job queue supports execution of jobs on any quantum computing device of a plurality of quantum computing devices.

18. The non-transitory computer-readable medium of claim 15, wherein the instructions further cause the at least one classical processor to:

determine an estimated time to execution for the first job; and configure the optimization process for the first job based on the estimated time to execution.

19. The non-transitory computer-readable medium of claim 15, wherein the instructions further cause the at least one classical processor to:

upon receiving the execution results from the execution of the updated quantum circuit, create a second job on the first job queue as an iteration of the first job; and perform an optimization process on another quantum circuit of the second job prior to execution of the second job.

20. The non-transitory computer-readable medium of claim 15, wherein the instructions further cause the at least one classical processor to perform multiple incremental optimization processes on each job of the plurality of jobs while the plurality of jobs are in the first job queue awaiting execution.

* * * * *